(12) United States Patent
Sorenson et al.

(10) Patent No.: US 12,104,094 B2
(45) Date of Patent: Oct. 1, 2024

(54) PHENOLIC RESIN COMPOSITION COMPRISING POLYMERIZED IONIC GROUPS, ABRASIVE ARTICLES AND METHODS

(71) Applicant: 3M INNOVATIVE PROPERTIES COMPANY, St. Paul, MN (US)

(72) Inventors: Gregory P. Sorenson, Maplewood, MN (US); Thomas J. Nelson, Woodbury, MN (US); Ilya Gorodisher, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1141 days.

(21) Appl. No.: 16/755,606

(22) PCT Filed: Dec. 17, 2018

(86) PCT No.: PCT/US2018/065930
§ 371 (c)(1),
(2) Date: Apr. 13, 2020

(87) PCT Pub. No.: WO2019/125995
PCT Pub. Date: Jun. 27, 2019

(65) Prior Publication Data
US 2020/0332162 A1 Oct. 22, 2020

Related U.S. Application Data
(60) Provisional application No. 62/599,889, filed on Dec. 18, 2017.

(51) Int. Cl.
*C09J 161/06* (2006.01)
*B24D 3/28* (2006.01)
(Continued)

(52) U.S. Cl.
CPC ........... *C09J 161/06* (2013.01); *B24D 3/285* (2013.01); *B24D 11/00* (2013.01); *C08J 9/0066* (2013.01); *C09D 161/06* (2013.01)

(58) Field of Classification Search
None
See application file for complete search history.

(56) References Cited

U.S. PATENT DOCUMENTS

| 1,910,444 A | 5/1933 | Nicholson |
| 2,958,593 A | 11/1960 | Hoover |
| (Continued) | | |

FOREIGN PATENT DOCUMENTS

| AU | 2013240253 B2 * 10/2013 |
| EP | 0070650 A1 * 1/1983 |
| (Continued) | |

OTHER PUBLICATIONS

Deng, "Tuning the Viscoelastic Properties of Poly(n-butyl acrylate) Ionomer Networks through the Use of Ion-Pair Comonomers", Macromolecules, 2017, vol. 50, No. 23, pp. 9473-9481.
(Continued)

*Primary Examiner* — Tae H Yoon
(74) *Attorney, Agent, or Firm* — Carolyn A. Fischer

(57) ABSTRACT

A phenolic resin composition is described comprising at least 50 wt.-% of phenolic resin; first polymerized units comprising a cationic group; and second polymerized units comprising an anionic group. The cationic groups are ionically bonded to the anionic groups. The ionic bonding of the cationic group and anionic group of the polymerized units can provide certain complex viscosity and/or tan delta properties. In some embodiments, the phenolic resin composition has a complex viscosity at 65 C of at least 50 Pascal(seconds) and/or has a tan delta at 65 C ranging from
(Continued)

0.5 to 2.5. Abrasive articles and methods of making an abrasive article are also described.

20 Claims, 2 Drawing Sheets

(51) Int. Cl.
*B24D 11/00* (2006.01)
*C08J 9/00* (2006.01)
*C09D 161/06* (2006.01)

(56) References Cited

U.S. PATENT DOCUMENTS

| | | |
|---|---|---|
| 3,041,156 A | 6/1962 | Rowse |
| 3,843,576 A | 10/1974 | Parkinson |
| 3,931,448 A | 1/1976 | Parkinson |
| 4,129,544 A | 12/1978 | Craig |
| 4,227,350 A | 10/1980 | Fitzer |
| 4,314,827 A | 2/1982 | Leitheiser |
| 4,418,120 A | 11/1983 | Kealy |
| 4,588,419 A | 5/1986 | Caul |
| 4,619,979 A | 10/1986 | Kotnour |
| 4,623,364 A | 11/1986 | Cottringer |
| 4,652,275 A | 3/1987 | Bloecher |
| 4,734,104 A | 3/1988 | Broberg |
| 4,737,163 A | 4/1988 | Larkey |
| 4,744,802 A | 5/1988 | Schwabel |
| 4,751,138 A | 6/1988 | Tumey |
| 4,770,671 A | 9/1988 | Monroe |
| 4,799,939 A | 1/1989 | Bloecher |
| 4,843,134 A | 6/1989 | Kotnour |
| 4,881,951 A | 11/1989 | Monroe |
| 4,991,362 A | 2/1991 | Heyer |
| 4,997,461 A | 3/1991 | Markhoff-Matheny |
| 5,009,675 A | 4/1991 | Kunz |
| 5,011,508 A | 4/1991 | Wald |
| 5,042,991 A | 8/1991 | Kunz |
| 5,078,753 A | 1/1992 | Broberg |
| 5,085,671 A | 2/1992 | Martin |
| 5,152,917 A | 10/1992 | Pieper |
| 5,201,916 A | 4/1993 | Berg |
| 5,203,884 A | 4/1993 | Buchanan |
| 5,213,591 A | 5/1993 | Celikkaya |
| 5,352,254 A | 10/1994 | Celikkaya |
| 5,366,523 A | 11/1994 | Rowenhorst |
| 5,378,251 A | 1/1995 | Culler |
| 5,435,816 A | 7/1995 | Spurgeon |
| 5,436,063 A | 7/1995 | Follett |
| 5,441,549 A | 8/1995 | Helmin |
| 5,496,386 A | 3/1996 | Broberg |
| 5,520,711 A | 5/1996 | Helmin |
| 5,591,239 A | 1/1997 | Larson |
| 5,609,706 A | 3/1997 | Benedict |
| 5,637,646 A | 6/1997 | Ellis |
| RE35,570 E | 7/1997 | Rowenhorst |
| 5,672,097 A | 9/1997 | Hoopman |
| 5,681,361 A | 10/1997 | Sanders, Jr. |
| 5,712,210 A | 1/1998 | Windisch |
| 5,804,610 A | 9/1998 | Hamer |
| 5,858,140 A | 1/1999 | Berger |
| 5,928,070 A | 7/1999 | Lux |
| 5,946,991 A | 9/1999 | Hoopman |
| 5,961,674 A | 10/1999 | Gagliardi |
| 5,975,987 A | 11/1999 | Hoopman |
| 5,975,988 A | 11/1999 | Christianson |
| 5,984,988 A | 11/1999 | Berg |
| 6,017,831 A | 1/2000 | Beardsley |
| 6,129,540 A | 10/2000 | Hoopman |
| 6,843,815 B1 | 1/2005 | Thurber |
| 7,151,190 B1 | 12/2006 | Riondel |
| 8,034,137 B2 | 10/2011 | Erickson |
| 8,142,531 B2 | 3/2012 | Adefris |
| 8,142,532 B2 | 3/2012 | Erickson |
| 8,142,891 B2 | 3/2012 | Culler |
| 8,764,865 B2 | 7/2014 | Boden |
| 9,447,311 B2 | 9/2016 | Adefris |
| 9,573,250 B2 | 2/2017 | Schwabel |
| 9,849,563 B2 * | 12/2017 | Thurber ............... B24D 3/002 |
| 10,358,773 B2 * | 7/2019 | Kimoto ............... D21H 17/72 |
| 2009/0165394 A1 | 7/2009 | Culler |
| 2009/0169816 A1 | 7/2009 | Erickson |
| 2009/0325466 A1 * | 12/2009 | Kincaid ............... B24D 3/20 |
| | | 451/28 |
| 2010/0151195 A1 | 6/2010 | Culler |
| 2010/0151201 A1 | 6/2010 | Erickson |
| 2010/0298505 A1 | 11/2010 | Arnaud |
| 2010/0319269 A1 | 12/2010 | Erickson |
| 2012/0227333 A1 | 9/2012 | Adefris |
| 2013/0040537 A1 | 2/2013 | Schwabel |
| 2013/0125477 A1 | 5/2013 | Adefris |
| 2013/0344786 A1 | 12/2013 | Keipert |
| 2014/0170362 A1 | 6/2014 | Ali |
| 2017/0039181 A1 | 2/2017 | Karov |
| 2017/0129075 A1 | 5/2017 | Thurber |
| 2017/0225299 A1 | 8/2017 | Keipert |

FOREIGN PATENT DOCUMENTS

| | | | |
|---|---|---|---|
| FR | 2894585 A1 * | 6/2007 | |
| JP | 2004050182 A * | 2/2004 | |
| JP | 2004256786 A * | 9/2004 | |
| WO | WO 2011-025847 | 3/2011 | |
| WO | WO 2011-087649 | 7/2011 | |
| WO | WO 2012-018903 | 2/2012 | |
| WO | WO 2016/143602 A * | 9/2016 | |
| WO | WO 2017-112450 | 6/2017 | |
| WO | WO 2018-005311 | 1/2018 | |

OTHER PUBLICATIONS

Zhang, "Polymeric ionic liquids based on ether functionalized ammoniums and perfluorinated sulfonimides", Polymer Aug. 2014, vol. 55, No. 16, pp. 3339-3348.

International Search Report for PCT International Application No. PCT/US2018/065930, mailed on Apr. 29, 2017, 7 pages.

* cited by examiner

PHENOLIC RESIN COMPOSITION COMPRISING POLYMERIZED IONIC GROUPS, ABRASIVE ARTICLES AND METHODS

CROSS REFERENCE TO RELATED APPLICATIONS

This application is a national stage filing under 35 U.S.C. 371 of PCT/US2018/065930, filed Dec. 17, 2018, which claims the benefit of U.S. Application No. 62/599,889, filed Dec. 18, 2017, the disclosure of which is incorporated by reference in its/their entirety herein.

SUMMARY

In one embodiment, a phenolic resin composition is described comprising at least 50 wt.-% of phenolic resin; first polymerized units comprising a cationic group; and second polymerized units comprising an anionic group. The cationic groups are ionically bonded to the anionic groups. In some embodiments, the cationic group is a substituted ammonium compound. In some embodiments, the anionic group is an acidic group. In some embodiments, the first polymerized units comprising the cationic group and second polymerized units comprising the anionic group are first and second polymerized units of a (e.g. acrylic) copolymer. In another embodiment, a first polymer comprising polymerized units comprising the cationic group is utilized in combination with a second polymer comprising polymerized units comprising the anionic group.

The ionic bonding of the cationic group and anionic group of the polymerized units can provide certain complex viscosity and/or tan delta properties. In some embodiments, the phenolic resin composition has a complex viscosity at 65° C. of at least 50 Pascal(seconds) and/or has a tan delta at 65° C. ranging from 0.5 to 2.5.

In another embodiment, an abrasive article is described comprising abrasive particles at least partially embedded in the cured phenolic resin composition.

In other embodiments, methods of making an abrasive article are described comprising: providing a phenolic resin composition having a complex viscosity at 65° C. of at least 50 Pascal(seconds) and/or a tan delta at 65° C. ranging from 0.5 to 2.5; applying abrasive particles to the phenolic resin composition; and curing the phenolic resin composition.

In some embodiments, the abrasive article or method further comprises a backing. In some embodiments, the abrasive particles of the abrasive article or method are shaped abrasive particles.

Figure 1:
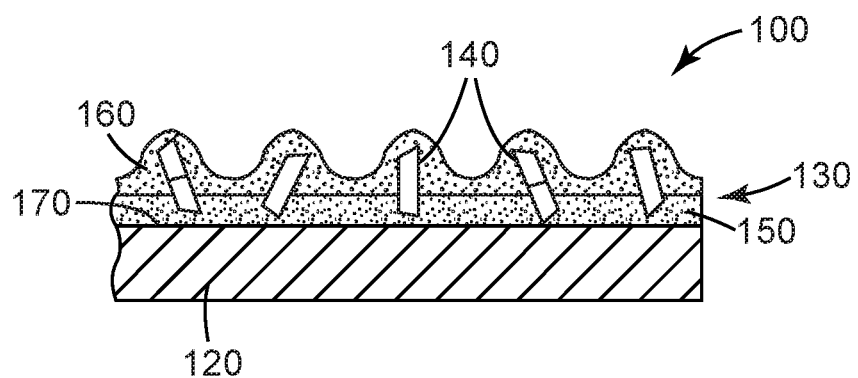
FIG. 1 is a cross-sectional side view of an exemplary coated abrasive article 100 according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Presently described are phenolic resin compositions, abrasive articles comprising such phenolic resin compositions, and methods of making abrasive articles.

Phenolic resins are generally formed by condensation of phenol and formaldehyde, and are usually categorized as resole or novolac phenolic resins. Novolac phenolic resins are acid-catalyzed and have a molar ratio of formaldehyde to phenol of greater than 1:1. Resole (also resol) phenolic resins can be catalyzed by alkaline catalysts, and the molar ratio of formaldehyde to phenol is less than or equal to one, typically between 1.0 and 3.0, thus presenting pendant methylol groups. Alkaline catalysts suitable for catalyzing the reaction between aldehyde and phenolic components of resole phenolic resins include sodium hydroxide, barium hydroxide, potassium hydroxide, calcium hydroxide, organic amines, and sodium carbonate, all as solutions of the catalyst dissolved in water.

Resole phenolic resins are typically coated as a solution with water and/or organic solvent (e.g., alcohol). Typically, the solution includes about 70 percent to about 85 percent solids by weight, although other concentrations may be used. If the solids content is very low, then more energy is required to remove the water and/or solvent. If the solids content is very high, then the viscosity of the resulting phenolic resin is too high which typically leads to processing problems.

Phenolic resins are well-known and readily available from commercial sources. Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co. of Bartow, Florida under the trade designation AEROFENE (e.g., AEROFENE 295); and those marketed by Kangnam Chemical Company Ltd. of Seoul, South Korea under the trade designation PHENOLITE (e.g., PHENOLITE TD-2207).

A general discussion of phenolic resins and their manufacture is given in Kirk-Othmer, *Encyclopedia of Chemical Technology*, 4th Ed., John Wiley & Sons, 1996, New York, Vol. 18, pp. 603-644.

The phenolic resin composition described herein typically comprises at least 50 wt.-% of (e.g., resol) phenolic resin based on the total weight of the organic portion of the phenolic resin composition (i.e., excluding inorganic components such as filler). In some embodiments, the phenolic resin composition comprises at least 55, 60, 65, 70, 75, 80, 85, or 90 wt.-% of (e.g., resol) phenolic resin based on the total weight of the organic components of the phenolic resin composition.

The phenolic resin composition further comprises first polymerized units comprising a cationic group. The total amount of first polymerized units comprising a cationic group is typically at least 0.1, 0.2, 0.3, 0.4, 0.5, 0.6, 0.7, 0.8, 0.9, or 1 wt.-% and is some embodiments at least 1.5, 2, 2.5 3, 3.5, 4, 4.5, or 5 wt.-% based on the total weight of the organic components of the phenolic resin composition (i.e. excluding inorganic components such as filler). The total amount of first polymerized units comprising a cationic group is typically no greater than 30 wt.-% and more typically no greater than 25 or 20 wt.-% of the total weight of the organic components of the phenolic resin composition. In some embodiments, the total amount of first polymerized units comprising a cationic group is no greater than 20, 19, 18, 17, 16, or 15 wt.-% of the total weight of the organic components of the phenolic resin composition. In some embodiments, the total amount of first polymerized units comprising a cationic group is no greater than 14, 13, 12, 11, or 10 wt.-% of the total weight of the organic components of the phenolic resin composition.

The phenolic resin composition further comprises first polymerized units comprising an anionic group. The total amount of first polymerized units comprising as anionic group is typically at least 0.1, 0.2, 0.3, 0.4, 0.5, 0.6, 0.7, 0.8, 0.9, or 1 wt.-% and is some embodiments at least 1.5, 2, 2.5 3, 3.5, 4, 4.5, or 5 wt.-% based on the total weight of the organic components of the phenolic resin composition (i.e. excluding inorganic components such as filler). The total amount of first polymerized units comprising an anionic group is typically no greater than 30 wt.-% and more typically no greater than 25 or 20 wt.-% of the total weight of the organic components of the phenolic resin composition. In some embodiments, the total amount of first polymerized units comprising an anionic group is no greater than 20, 19, 18, 17, 16, or 15 wt.-% of the total weight of the organic components of the phenolic resin composition. In some embodiments, the total amount of first polymerized units comprising an anionic group is no greater than 14, 13, 12, 11, or 10 wt.-% of the total weight of the organic components of the phenolic resin composition.

The phenolic resin composition optionally further comprises other non-ionic polymerized units, such as polymerized units of non-ionic polar monomers. The total amount of non-ionic polymerized units can be 0, 0.5, 1, 2, 3, 4, or 5 wt.-% based on the total weight of the organic components of the phenolic resin composition (i.e., excluding inorganic components such as filler). The total amount of non-ionic polymerized units is typically no greater than 30 wt.-% and more typically no greater than 25 or 20 wt.-% of the total weight of the organic components of the phenolic resin composition. In some embodiments, the total amount of non-ionic polymerized units is no greater than 20, 19, 18, 17, 16, or 15 wt.-% of the total weight of the organic components of the phenolic resin composition. In some embodiments, the total amount of non-ionic polymerized units is no greater than 14, 13, 12, 11, or 10 wt.-% of the total weight of the organic components of the phenolic resin composition.

In some embodiments, the moles of first polymerized units comprising a cationic group is about equal to the moles of second polymerized units comprising an anionic group. In otherwords the first polymerized units comprising a cationic group and second polymerized units comprising an anionic group are present at a molar ratio of about 1:1.

Although a molar ratio of about 1:1 is surmised optimal for maximizing the ionic bonding, molar ratios other than 1:1 are also useful provided there is sufficient ionic bonding to achieve the desired complex viscosity and/or tan delta properties. For example, the molar ratio of first polymerized units comprising a cationic group and second polymerized units comprising an anionic group may range from 1:10 to 10:1, or range from 5:1 to 1:5, or range from 3:1 to 1:3, or range 2:1 to 1:2.

Without intending to be bound by theory, the cationic groups are surmised to be ionically bonded to the anionic groups. The cationic groups are counterions for the anionic groups, and vice-versa. The ionic bonding between the cationic and anionic group can increase the complex viscosity (as measured according to the Viscoelastic Characterization test method described in the examples) of the phenolic resin composition, especially at elevated temperatures, e.g. 65° C.

With reference to Table 6 of the forthcoming examples, in some embodiments, the complex viscosity of the phenolic resin composition or organic components thereof at 20° C. is at least 1000, 1500, or 2000 Pascal(seconds). In some embodiments, the complex viscosity of the phenolic resin composition or organic components thereof at 20° C. is at least 2500, 3000, 3500, 4000, 4500, 5000, 5500 or 6000 Pascal(seconds). In some embodiments, the complex viscosity of the phenolic resin composition or organic components thereof at 20° C. is no greater than 15,000; 14,000; 13;000; 12,000; or 10,000 Pascal(seconds). When the viscosity is too high the (e.g. shaped) abrasive particles do not sufficiently penetrate and adhere to the phenolic resin (e.g. make) layer. When the viscosity is too low, the (e.g. shaped) abrasive particles do not maintain their (e.g. z-direction) position after being applied to the phenolic resin (e.g. make) layer.

The phenolic resin composition can be heated to reduce the complex viscosity. The phenolic resin composition is also typically heated to accelerate the curing of the phenolic resin composition. With reference to Table 6 of the forthcoming examples, in some embodiments, the complex viscosity of the phenolic resin composition or organic components thereof at 65° C. is at least 1000, 1500, or 2000 Pascal(seconds). In some embodiments, the complex viscosity of the phenolic resin composition or organic components thereof at 20° C. is at least 35, 40, 45, or 50 Pascal (seconds). In some embodiments, the complex viscosity of the phenolic resin composition or organic components thereof at 65° C. is at least 60, 70, 80 or 90 Pascal(seconds).

In some embodiments, the complex viscosity of the phenolic resin composition or organic components thereof at 65° C. is at least 100, 150, 200, 250, 300, 350, 400, 450, or 500 Pascal(seconds). In some embodiments, the complex viscosity of the phenolic resin composition or organic components thereof at 65° C. is no greater than 2000, 1500, or 1000 Pascal(seconds).

The ionic bonding between the cationic and anionic group can decrease the tan delta (as measured according to the Viscoelastic Characterization test method described in the examples) of the phenolic resin, especially at elevated temperatures, e.g., 65° C. With reference to Table 6 of the forthcoming examples, the phenolic resin composition or organic components thereof typically has a tan delta at 65° C. ranging from 0.5 to 2.5. When the tan delta is too high the (e.g. shaped) abrasive particles do not maintain their (e.g. z-direction) position after being applied to the phenolic resin (e.g. make) layer. When the tan delta is too low, the (e.g. shaped) abrasive particles do not sufficiently penetrate and adhere to the phenolic resin (e.g. make) layer.

In some embodiments, the first polymerized units comprising a cationic group and second polymerized units comprising an anionic group are first and second polymerized units of a polymer, such as an acrylic copolymer. In some embodiments, the acrylic copolymer comprises an acrylic backbone, first pendent groups comprising the first polymerized units comprising the cationic group and second pendent groups comprising the second polymerized units comprising the anionic group. Thus, the cationic group and anionic group are located on different polymerized units, or in other words are not part of the same polymerized unit.

In other embodiments, a first polymer (e.g. copolymer) comprises polymerized units comprising a cationic group and a second polymer (e.g. copolymer) comprises units comprising an anionic group. The first polymer and second polymer are combined with the phenolic resin.

In some embodiments, the polymerized units are polymerized ethylenically unsaturated groups. In some embodiments, the ethylenically unsaturated groups are free-radically polymerizable groups including (meth)acryl such as (meth)acrylamide ($H_2C=CHCON—$ and $H_2C=CH(CH_3)CON—$) and (meth)acrylate ($CH_2CHCOO—$ and $CH_2C(CH_3)COO—$). Other ethylenically unsaturated (e.g., free-radically) polymerizable groups include vinyl ($H_2C=C—$) including vinyl ethers ($H_2C=CHOCH—$).

In one embodiment, an (e.g. acrylic) copolymer is prepared from copolymerizing at least one polymerizable (e.g., ethylenically unsaturated) monomer comprising an anionic group, at least one polymerizable (e.g., ethylenically unsaturated) monomer comprising a cationic group, and optionally other non-ionic monomers.

The polymerizable monomers typically have a molecular no greater than 2000 g/mole, 1500 g/mole, or 1000 g/mole.

The polymerizable anionic monomer can have the general formula:

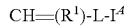

wherein $R^1$ is hydrogen or methyl;
L is a covalent bond or a divalent linking group comprising up to 30 carbon atoms; and
$I^A$ is an anionic group.

L can be ($C_1$-$C_4$) alkylene, arylene, alkylarylene, or arylalkylene. L can further comprise heteroatoms such as oxygen (ester) or nitrogen (amide). L can include combinations of such moieties, such as an ester and an alkylene moiety. In some embodiments, L comprises no greater than 24, 22, 20, 18, 16, 14, 12, 10, or 8 carbon atoms. In some embodiments, L comprises alkylene groups having less than 8, 7, 6, 5, or 4 carbon atoms. In some embodiments, L comprises alkylene groups having 1, 2 or 3 carbon atoms.

The chain length of L can affect the glass transition temperature (Tg) of (a homopolymer prepared from) the anionic monomer. In some embodiments, the anionic monomer has a Tg of at least 50, 60, 70, 80, 90, or 100° C. In some embodiments, the anionic monomer has a Tg of at least 110, 120, 130, 140, 150, 160, 170, 180, 190, or 200° C. In some embodiments, the anionic monomer has a Tg no greater than 250° C.

The anionic group, $I^A$, can be inorganic or organic. In typical embodiments, the anionic group, $I^A$, is carboxylate ($—COO^-$), sulfate ($—SO_4^-$), sulfonate ($—SO_3^-$), phosphonate ($—PO_3^-$) or phosphate ($—OPO_3^-$). The anionic group may optionally be fluorinated.

Although the starting monomer may be a salt of such acidic monomers, the salt counterion (e.g. $Na^+$) is typically exchanged for the cation of the cationic monomer during preparation of the polymer.

In one embodiment, such as in the case of (meth)acrylic acid; $R_1$ is hydrogen or methyl, L is a covalent bond, and $I^A$ is a carboxylate group.

In another embodiment, such as in the case of 2-carboxyethyl acrylate; $R_1$ is hydrogen, L comprises an ester moiety and alkylene (ethylene) moiety, and $I^A$ is a carboxylate group.

In another embodiment, such as in the case of 2-acrylamido-2-methyl-1-propanesulfonic acid (AMPS); $R_1$ is hydrogen, L comprises an amido moiety and alkylene (2-methyl-1-propane) moiety, and $I^A$ is a sulfonate group.

In another embodiment, such as in the case of 2-sulfoethyl (meth)acrylate and 3-sulfopropyl (meth)acrylate; $R_1$ is hydrogen or methyl, L comprises an ester moiety and alkylene group (ethylene or propylene) moiety, and $I^A$ is a sulfonate group.

In another embodiment, such as in the case of 4-styrenesulfonic acid; $R_1$ is hydrogen, L is an alkylarylene (methyl styrene) moiety, and $I^A$ is a sulfonate group.

In another embodiment, such as in the case of 2-((meth)acryloxy)ethyl phosphate; $R_1$ is methyl, L comprises an ester and alkylene (ethylene) moiety, and $I^A$ is a phosphate group.

In another embodiment, such as in the case of N-[3-(dimethylamino)propyl]-acrylamide; $R_1$ is methyl, L comprise an amido moiety and alkylene (propylene) moiety, and $I^A$ is an amine group.

In another embodiment, such as in the case of N-[3-[[[(trifluoromethyl)sulfonyl]amino]sulfonyl]propyl]-2-propenamide; $R_1$ is methyl, L comprises an amino moiety and alkylene (propylene) moiety, and $I^A$ is a3-[[[(trifluoromethyl)sulfonyl]amino group.

In some embodiments, the anionic monomer may be characterized as an acid functional monomer including, but not limited to, those selected from ethylenically unsaturated carboxylic acids, ethylenically unsaturated sulfonic acids, ethylenically unsaturated phosphonic acids, and mixtures thereof. Other examples include itaconic acid, fumaric acid, crotonic acid, citraconic acid, maleic acid, oleic acid, β-carboxyethyl (meth)acrylate, vinylphosphonic acid, and mixtures thereof.

In some embodiments, the acrylic copolymer comprises greater than 10, 15, 25, or 30 wt.-% of polymerized units of acid functional monomer as the anionic monomer. In some embodiments, the acrylic copolymer comprises no greater than 50, 45, or 40 wt.-% of polymerized units of acid functional monomer.

In other embodiments, the acrylic polymer (e.g., PE-3) comprises little or no polymerized units of acid functional monomer(s). In this embodiment, the acrylic polymer comprises polymerized units of an acid functional monomer(s) in an amount of zero or less than 5, 4, 3, 2, 1, 0.5, or 0.1 wt.-%

The polymerizable cationic monomer can have the general formula:

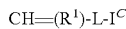

wherein $R_1$ and L are the same as previously described and $I^C$ is a cationic group.

Suitable cations include substituted ammonium groups, substituted phosphonium groups, substituted pyridinium groups, and substituted imidazolium groups. The structures of these cations are depicted as follows:

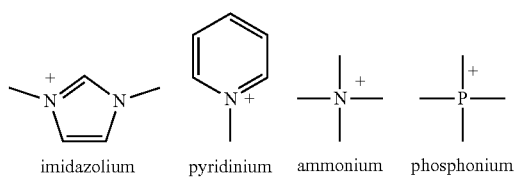

Other cations include pyrazolium, pyrrolidinium, cholinium, and morpholinium.

In one embodiment, such as in the case of 4-vinyl pyridine; $R_1$ is hydrogen, L comprises a covalent bond and $I^C$ is pyridinium.

In another embodiment, such as in the case of N-vinyl imidazole; $R_1$ is hydrogen, L comprises a covalent bond and $I^C$ is imidazolium.

In another embodiment, such as in the case of (meth) acryloylcholine; $R_1$ is methyl, L comprises a covalent bond and $I^C$ is cholinium ($—OCH_2CH_2N^+(CH_3)_3$).

In another embodiment, such as in the case of 2-N-morpholinoethyl (meth)acrylate; $R_1$ is methyl, L comprises an ester moiety and alkylene (ethylene) moiety and $I^C$ is 2-N-morpholino, a heterocyclic moiety having an oxygen atom and positively charge nitrogen atom.

In typical embodiments, $I^C$ is a substituted ammonium or phosphonium having the formula

wherein E is nitrogen or phosphorous and $R_2$, $R_3$, and $R_4$ are independently H, ($C_1$-$C_4$) alkyl, aryl, alkylarylene, or arylalkylene; that may optionally comprise heteroatoms such as oxygen, nitrogen, or sulfur. In other embodiments, at least one of the alkyl groups may comprise a longer chain, ranging up to 12, 14, 16, 18, 20, or 22 carbon atoms.

When $R_2$, $R_3$, and $R_4$ are each H, the starting cationic monomer (e.g. used in the preparation of the polymer) is characterized as a primary amine. When one of $R_2$, $R_3$, and $R_4$ comprises an organic group such as alkyl and the other two groups are hydrogen the starting monomer may be characterized as a secondary amine. When two of $R_2$, $R_3$, and $R_4$ comprises an organic group such as alkyl, and the other group is hydrogen, the starting monomer may be characterized as a tertiary amine. The primary, secondary, or tertiary amine can react with acid or an acidic anionic group, converting the amine to a positively charged ammonium ion (cation).

Examples of substituted ammonium or phosphonium cations are described in U.S. Pat. No. 7,151,190; incorporated herein by reference; Polymer 2014, 55(16), 3339-3348; and Macromolecules, 2017, 50, 9473-9481.

In one embodiment, the starting monomer is dimethylaminoethyl (meth)acrylate (depicted as follows) wherein; $R_1$ is hydrogen or methyl, L comprises an ester moiety and alkylene (ethylene) moiety and $I^C$ is dimethylamine.

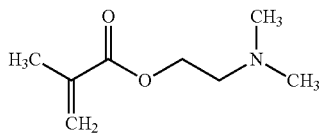

In the presence of an acid or acidic group, the $—N(CH_3)_2$ group is converted to $—N^+H(CH_3)_2$.

Other representative starting amine monomers that are converted to a cationic monomer in the presence of an acid include include dimethlyaminopropyl (meth)acrylate, dimethlyaminopropyl (meth)acrylamide, N-[3-(dimethylamino) propyl]-acrylamide, and 2-diisopropylaminoethyl (meth) acrylate.

The (e.g., acrylic copolymer) is prepared from copolymerizing at least one anionic monomer and at least one cationic monomer. Optional non-ionic monomers can be included in the copolymerization.

These monomers may be polymerized by any conventional free radical polymerization method, including solution, radiation, bulk, dispersion, emulsion, and suspension processes. The resulting (co)polymers are typically random copolymers.

Initiators useful in preparing acrylic polymers are initiators that, on exposure to heat or light, generate free-radicals which initiate (co)polymerization of the monomer mixture. Water-soluble initiators are preferred for preparing the polymers by emulsion polymerization. Suitable water-soluble initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO™ 64 (2,2'-azobis(isobutyronitrile)) and VAZO™ 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)). When used, initiators may comprise from about 0.05 to about 1 part by weight, preferably about 0.1 to about 0.5 part by weight based on 100 parts by weight of organic components.

A typical solution polymerization method is carried out by adding the polymerizable monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

In a typical photopolymerization method, a mixture of polymerizable monomers may be irradiated with ultraviolet (UV) rays in the presence of a photopolymerization initiator (i.e., photoinitiators). Preferred photoinitiators are those available under the trade designations IRGACURE™ and DAROCUR™ from Ciba Speciality Chemical Corp., Tarrytown, NY and include 1-hydroxy cyclohexyl phenyl ketone (IRGACURE™ 184), 2,2-dimethoxy-1,2-diphenylethan-1-one (IRGACURE 651), bis(2,4,6-trimethylbenzoyl) phenylphosphineoxide (IRGACURE™ 819), 1-[4-(2-hydroxyethoxy)phenyl]-2-hydroxy-2-methyl-1-propane-1-one (IRGACURE™ 2959), 2-benzyl-2-dimethylamino-1-(4-morpholinophenyl)butanone (IRGACURE™ 369), 2-methyl-1-[4-(methylthio)phenyl]-2-morpholinopropan-1-one (IRGACURE™ 907), and 2-hydroxy-2-methyl-1-phenyl propan-1-one (DAROCUR™ 1173). Particularly preferred photoinitiators are IRGACURE™ 819, 651, 184 and 2959.

Solventless polymerization methods, such as the continuous free radical polymerization method described in U.S. Pat. Nos. 4,619,979 and 4,843,134 (Kotnour et al.), the essentially adiabatic polymerization methods using a batch reactor described in U.S. Pat. No. 5,637,646 (Ellis), and the methods described for polymerizing packaged pre-adhesive compositions described in U.S. Pat. No. 5,804,610 (Hamer et al.) may also be utilized to prepare the polymers.

The copolymerizable mixture of monomers may optionally further comprise chain transfer agents to control the molecular weight of the resultant polymer. Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide. The polymerizable mixture may further comprise up to about 0.5 parts by weight of a chain transfer agent, typically about 0.01 to about 0.5 parts by weight, if used, preferably about 0.05 parts by weight to about 0.2 parts by weight, based upon 100 parts by weight of the total monomer mixture.

In some embodiments, a (e.g., acrylic) copolymer is prepared from at least one polymerizable cationic monomer and at least one polymerizable anionic monomer, in the absence of other comonomers.

The copolymer may be represented by the formula

-[M$^C$]$n$-[M$^A$]$m$- wherein M$^C$ represent polymerized units of cationic monomer, M$^A$ represent polymerized units of anionic monomer, n is the number of polymerized units of cationic monomer, and m is the number of polymerized units of anionic monomer.

One representative acrylic copolymer of such formula is depicted as follows:

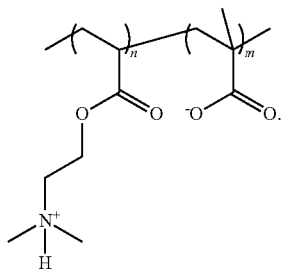

(PE-3 of examples)

In another embodiment, a (e.g. acrylic) copolymer is prepared from at least one polymerizable cationic monomer, at least one polymerizable anionic monomer, and other optional non-ionic comonomers.

The polymer may be represented by the formula

-[M$^C$]$n$-[M$^A$]$m$-[M$^P$]$p$- wherein M$^C$ represent polymerized units of cationic monomer, M$^A$ represent polymerized units of anionic monomer, M$^P$ represent polymerized units of non-ionic (e.g. polar) monomer, n is the number of polymerized units of cationic monomer, m is the number of polymerized units of anionic monomer, and p is the number of polymerized units of non-ionic (e.g. polar) monomer.

For embodiments, wherein a first polymer comprising a cationic group is utilized in combination with a second polymer comprising an anionic group, the first and second polymer may be represented by the formulas -[M$^C$]$n$-[M$^P$]$p$- and -[M$^A$]$m$-[M$^P$]$p$-;

wherein M$^C$, M$^A$, and M$^P$ are the same as described above.

In some embodiments, the copolymer is prepared from at least one polymerizable polar monomer and thus the polymer comprises polymerized units of at least one polar monomer. As used herein the term "polar monomers" is exclusive of ionic (e.g. acid functional) monomers. The inclusion of polar monomer(s) can improve the miscibility of the copolymer with the phenolic resin.

Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkyleneoxy) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono (meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone.

Representative acrylic copolymers are depicted as follows:

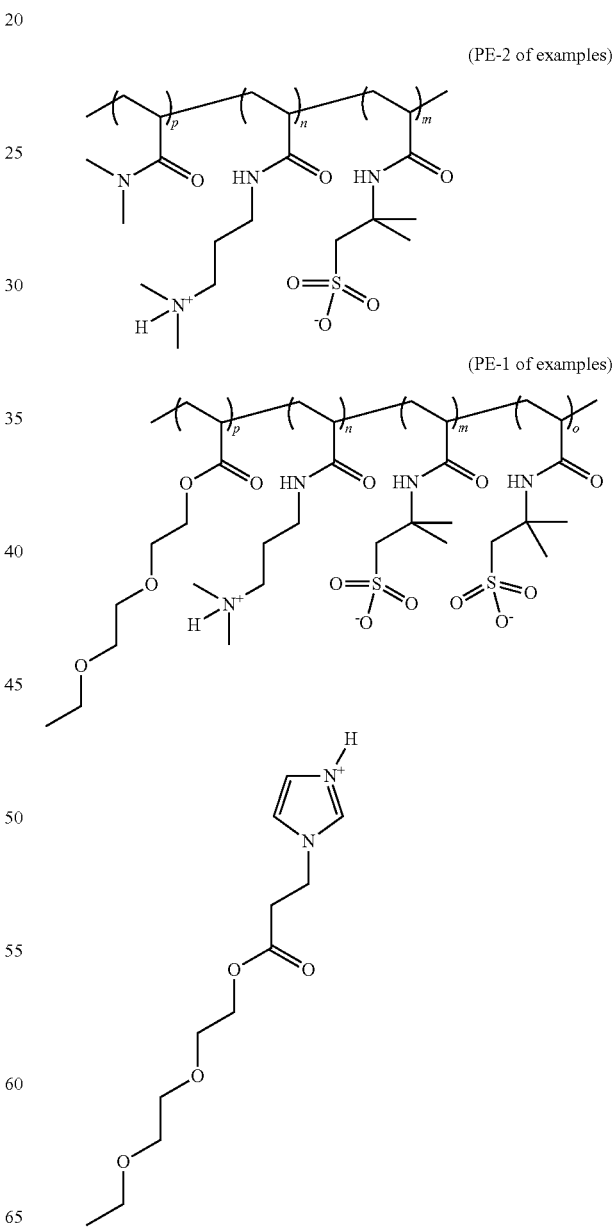

In some embodiments, a portion of the anionic groups and/or cationic groups are bonded to an unpolymerized ionic compound or in other words, an ionic compound that lacks a polymerizable group. Thus, such ionic compound is not covalently bonded to the (e.g. acrylic) polymer backbone. However, such compound is ionically bonded to a portion of the anionic groups and/or cationic groups of the (e.g. acrylic) polymer. For example, with reference to acrylic copolymer PE-1, depicted above, a portion of the anionic groups (i.e., sulfonate ions) are ionically bonded to a cationic (e.g. imidazole) compound. The subscript "o" represents the number of anionic groups bonded to the unpolymerized ionic imidazole compound Such imidazole compound has the formula:

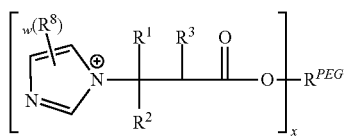

$R^1$ is H or a $C_1$-$C_{25}$ alkyl group, $R^2$ is H or —CO—$X^1$—$R^5$, where $R^5$ is a H, a $C_1$-$C_{25}$ alkyl group or $R^{PEG}$ and $X^1$ is —O— or —$NR^6$—, where $R^6$ is H or a $C_1$-$C_6$ alkyl;

$R^3$ is H or $CH_3$, $R^8$ is a (hetero) hydrocarbyl group, and w is 0-3, preferably 0; and $R^{PEG}$ is a poly(alkyleneoxy) containing group; and subscript x is 1 or 2.

Other imidazole compounds according to this formula are described in PCT/US2017/039181; incorporated herein by reference.

An example of a first polymer comprising a cationic group and a second polymer comprising an anionic group that are utilized in combination in the phenolic resin are as follows:

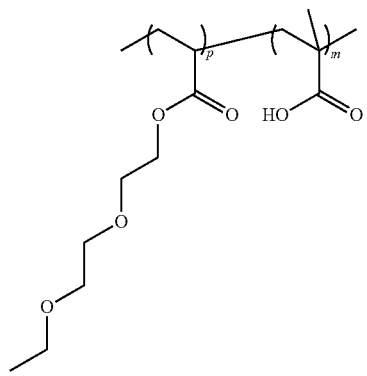

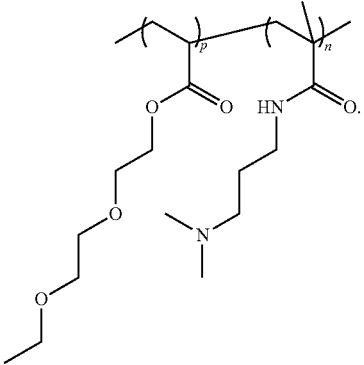

-continued

In each of the formulas depicted above "n" is the number of polymerized units of cationic monomer and is selected such that the copolymer comprises at least 0.5, 1, 1.5, 2, 2.5, 3, 3.5, 4, 4.5 or 5 wt.-% of such polymerized units. When the copolymer comprises a small amount of polymerized units of cationic monomer, a higher concentration of copolymer may be required to obtain the desired complex viscosity and tan delta properties. In some embodiments, the number (i.e. n) of polymerized units of cationic monomer is selected such that the copolymer comprises at least 6, 7, 8, 9, 10, 11, 12, 13, 14, 15 wt. % of such polymerized units. In some embodiments, the number (i.e. n) of polymerized units of cationic monomer is selected such that the copolymer comprises at least 20, 25, 30, or 35 wt. % of such polymerized units. The number (i.e. n) of polymerized units of cationic monomer is selected such that the copolymer comprises no greater the 99.5, 99, 98.5, 98, 97.5, 97, 96.5, 96, 95.5, 95 wt. % of such polymerized units. In some embodiments, the number (i.e. n) of polymerized units of cationic monomer is selected such that the copolymer comprises no greater than 90, 85, 80, 75, 70, 65, 60, 55, 50 wt. %.

In each of the formulas depicted above "m" is the number of polymerized units of anionic monomer and is selected such that the copolymer comprises at least 0.5, 1, 1.5, 2, 2.5, 3, 3.5, 4, 4.5 or 5 wt.-% of such polymerized units. When the copolymer comprises a small amount of polymerized units of anionic monomer, a higher concentration of copolymer may be required to obtain the desired complex viscosity and tan delta properties. In some embodiments, the number (i.e. m) of polymerized units of anionic monomer is selected such that the copolymer comprises at least 6, 7, 8, 9, 10, 11, 12, 13, 14, 15 wt. % of such polymerized units. In some embodiments, the number (i.e. m) of polymerized units of anionic monomer is selected such that the copolymer comprises at least 20, 25, 30, or 35 wt. % of such polymerized units. The number (i.e. m) of polymerized units of anionic monomer is selected such that the copolymer comprises no greater the 99.5, 99, 98.5, 98, 97.5, 97, 96.5, 96, 95.5, or 95 wt. % of such polymerized units. In some embodiments, the number (i.e. m) of polymerized units of anionic monomer is selected such that the copolymer comprises no greater than 90, 85, 80, 75, 70, 65, 60, 55, 50 wt. %.

In each of the formulas depicted above "p" is the number of polymerized units of nonionic monomer. In some embodiments, the acrylic copolymer (e.g., PE-3) comprises little or no polymerized units of non-ionic monomer(s), such as polar monomer(s). In this embodiment, the number (i.e. p) of polymerized units of a non-ionic (e.g. polar) monomer(s) is zero or selected such that the copolymer comprises less than 0.5 wt.-% of such units.

In other embodiments, "p" is selected such that the copolymer comprises at least 0.5, 1, 1.5, 2, 2.5, 3, 3.5, 4, 4.5 or 5 wt.-% of such polymerized units. In some embodiments, the number (i.e. p) of polymerized units of non-ionic monomer is selected such that the copolymer comprises at least 6, 7, 8, 9, 10, 11, 12, 13, 14, 15 wt. % of such polymerized units. In some embodiments, the number (i.e. p) of polymerized units of non-ionic monomer is selected such that the copolymer comprises at least 20, 25, 30, or 35 wt. % of such polymerized units. The number (i.e. p) of polymerized units of non-ionic monomer is selected such that the copolymer comprises no greater the 99, 98.5, 98, 97.5, 97, 96.5, 96, 95.5, or 95 wt. % of such polymerized units. In some embodiments, the number (i.e. p) of polymerized units of non-ionic monomer is selected such that the copolymer comprises no greater than 90, 85, 80, 75, 70, 65, 60, 55, 50 wt. % of such polymerized units.

In each of the formulas depicted above "o" is the number of polymerized units of ionic monomer bonded to an unpolymerized ionic compound. In some embodiments, "o" is selected such that the (e.g., acrylic) copolymer comprises at least 0.5, 1, 1.5, 2, 2.5, 3, 3.5, 4, 4.5 or 5 wt.-% of anionic groups and/or cationic groups bonded to an unpolymerized ionic compound. In some embodiments, "o" is selected such that the (e.g., acrylic) copolymer comprises at least 10, 15, 20 or 25 wt.-% of such polymerized units. In some embodiments, "o" is selected such that the (e.g. acrylic) copolymer comprises no greater than 50, 45, 40, 35, or 30 wt.-% of anionic groups and/or cationic groups bonded to an unpolymerized ionic compound.

In other embodiments, the acrylic polymer (e.g., PE-1 and PE-2) comprises little or no anionic groups and/or cationic groups bonded to an unpolymerized ionic compound, i.e. "o" zero or selected such that the amount of such units is less than 0.5 wt.-%.

The phenolic resin or acrylic copolymer may optionally contain polymerized units of an acrylate or methacrylate ester of an alcohol having at least 4, 6, or 8 ranging up to 12 carbon atoms includes acrylate or methacrylate esters of linear, branched, or cyclic alcohols. Representative acrylate or methacrylate esters include octyl, isooctyl, nonyl, isononyl, decyl, undecyl, and dodecyl alcohol. In some embodiments, the alcohol is isooctyl alcohol. In some embodiments, the acrylic copolymer, comprises less than 50, 45, 40, 35, 30, 25, 20, 15, 10, or 5 wt.-% of an acrylate or methacrylate ester of an alcohol having 4 to 12 carbons. The phenolic resin may comprise less than 25, 20, 15, 10, 5 or 2.5 wt.-% of polymerized units of an acrylate or methacrylate ester of an alcohol having 4 to 12 carbons.

The polymerized units comprising a cationic group, polymerized units comprising an anionic group, and optional polymerized units are generally selected such that the (e.g. acrylic) polymer is miscible in the phenolic resin.

The acrylic polymer (e.g. copolymer) comprising polymerized units comprising a cationic group and/or polymerized units comprising an anionic group typically has a molecular size as determined dynamic light scattering (according to the method described in the examples) of at least 10, 15, 20, or 25 nm ranging up to 100, 200, 300, 400 or 500 nm. The acrylic polymer (e.g. copolymer) comprising polymerized units comprising a cationic group and/or polymerized units comprising an anionic group typically has a molecular weight ($M_D$) as determined dynamic light scattering (according to the method described in the examples) of at least 50, 100, or 150 kg/mole and typically no greater than 2000, 1500, 1000, or 750 kg/mole.

The phenolic resin composition typically comprises at least 1, 2, 3, 4, 5, 6, 7, 8, 9, or 10 wt. % of acrylic polymer (e.g. copolymer) comprising polymerized units comprising a cationic group and polymerized units comprising an anionic group. Alternatively, the total amount of first acrylic copolymer comprising polymerized units comprising a cationic group together with a second acrylic copolymer comprising polymerized units comprising an anionic group is at least 1, 2, 3, 4, 5, 6, 7, 8, 9, or 10 wt. % of the phenolic resin composition. The amount of acrylic polymer(s) is typically no greater than 50 wt. % of the phenolic resin composition. In some embodiments, the amount of acrylic polymer(s) is no greater than 45, 40, 35, 30, 25, 20, 15, 10, or 5 wt. %.

The phenolic resin composition may optionally further comprise an aliphatic tack modifier, such as described in US2017/0129075. Examples of suitable aliphatic tack modifiers include: aliphatic rosins and aliphatic derivatives thereof; aliphatic liquid hydrocarbon resins; aliphatic solid hydrocarbon resins; liquid natural rubber; hydrogenated polybutadiene; polytetramethylene ether glycol; isooctyl acrylate-acrylic acid copolymers as described in U.S. Pat. No. 4,418,120 (Kealy et. al; and acrylic zwitterionic amphiphilic polymers as described in U.S. Pat. Appln. Publ. 2014/0170362 A1 (Ali et al.). However, in typical embodiments, the phenolic resin composition comprises less than 10, 9, 8, 7, 6, 5, 4, 3, 2, or 1 wt.-% of such aliphatic tack modifiers.

Useful aliphatic rosins and aliphatic derivatives thereof include, for example, aliphatic esters of natural and modified rosins and the hydrogenated derivatives thereof (e.g., a glycerol ester of tall oil rosin marketed as PERMALYN 2085 and a glycerol ester of hydrogenated gum rosin marketed as FORAL 5-E, both available from Eastman Chemical Company, and an aliphatic rosin ester dispersion obtained as AQUATAC 6085 from Arizona Chemical, Jacksonville, Florida), hydrogenated rosin resins (e.g., partially hydrogenated rosin is produced by Eastman Chemical Company as STAYBELITE-E and completely hydrogenated rosin is branded as FORAL AX-E), dimerized rosin resins (e.g., POLY-PALE partially dimerized rosin is a partially dimerized rosin product offered by Eastman Chemical Company), and aliphatic modified rosin resins (e.g., maleic anhydride modified rosin resins marketed as LEWISOL 28-M or LEWISOL 29-M).

Examples of aliphatic hydrocarbon resin tackifiers include tackifiers derived from liquid C5 feedstock by Lewis acid catalyzed polymerization, and hydrogenated derivatives thereof. Commercially available aliphatic hydrocarbon resin tackifiers include those marketed by Eastman Chemical Company, Kingsport, Tennessee, under the trade designations PICCOTAC 1020, PICCOTAC 1095, PICCOTAC 1098, PICCOTAC 1100, and PICCOTAC 1115, and in hydrogenated forms as EASTOTAC H-100E, EASTOTAC H-115E and EASTOCTAC H-130E.

Liquid natural rubber is a modified form of natural rubber with a shorter polymeric chain. Many liquid natural rubbers are commercially available. Examples include liquid natural rubbers marketed by DPR industries, Coatesville, Pennsylvania, under the trade designations DPR 35, DPR 40, DPR 75, and DPR 400.

Hydrogenated polybutadienes are available commercially; for example, as KRATON LIQUID L1203 from Kraton Polymers US LLC, Houston, Texas, and as POLYTAIL from Mitsubishi International Polymer/Trade Corporation, Newark, New Jersey.

Polytetramethylene ether glycol (PTMEG) is a waxy, white solid that melts to a clear, colorless viscous liquid near room temperature. PTMEG is produced by the catalyzed polymerization of tetrahydrofuran. Exemplary polytetramethylene ether glycols include those available under the trade designation TETRATHANE from Invista, Waynesboro, Virginia (e.g., TETRATHANE 250, 650, 1000, 1400, 1800, 2000 and 2900).

Useful copolymers of isooctyl acrylate and acrylic acid are described in U.S. Pat. No. 4,418,120 (Kealy et. al). Examples include copolymers of isooctyl acrylate (IOA) and acrylic acid (AA) wherein the weight ratio of IOA:AA is in the range of from 93:7 to 97:3; more preferably abut 95:5.

Useful aliphatic zwitterionic amphiphilic acrylic polymers are described in U.S. Pat. Appln. Publ. 2014/0170362 A1 (Ali et al.).

The phenolic resin composition may also contain additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the preferred properties. The coupling agents can improve adhesion to the abrasive particles and/or filler. The binder chemistry may be thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.).

The phenolic resin composition may also contain filler materials or grinding aids, typically in the form of a particulate material. Typically, the particulate materials are inorganic materials. Examples of useful fillers for this disclosure include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In some embodiments, the phenolic resin composition comprises an inorganic filler. Such compositions may include at least 10, 15, 20, 25, 30, 35, or 40 wt.-% filler, based on the total weight of the composition. In some embodiments, the total amount of filler is no greater than 60, 55, or 50 wt.-% based on the total weight of the composition.

The phenolic resin described herein is suitable for use in making abrasive articles. The abrasive article generally comprises abrasive particles at least partially embedded in the cured phenolic resin composition. The cured phenolic resin composition can be characterized as the make layer of a coated abrasive article.

An exemplary embodiment of a coated abrasive article according to the present disclosure is depicted in FIG. 1. Referring now to FIG. 1, coated abrasive article 100 has a backing 120 and abrasive layer 130. Abrasive layer 130 includes abrasive particles 140 secured to a major surface 170 of backing 120 (substrate) by make layer 150 and size layer 160. Additional layers, for example, such as an optional supersize layer (not shown) that is superimposed on the size layer, or a backing antistatic treatment layer (not shown) may also be included, if desired.

The size layer precursor may be the same as or different than the make layer precursor. Examples of suitable thermosetting resins that may be useful for the size layer precursor include, for example, free-radically polymerizable monomers and/or oligomers, epoxy resins, acrylic resins, urethane resins, phenolic resins, urea-formaldehyde resins, melamine-formaldehyde resins, aminoplast resins, cyanate resins, or combinations thereof. Useful binder precursors include thermally curable resins and radiation curable resins, which may be cured, for example, thermally and/or by exposure to radiation.

The size layer precursor may also be modified by various additives (e.g., as discussed above in regard to the make coat precursor). Catalysts and/or initiators may be added to thermosetting resins; for example, according to conventional practice and depending on the resin used.

Coated abrasive articles according to the present disclosure may include additional layers such as, for example, an optional supersize layer that is superimposed on the abrasive layer, or a backing antistatic treatment layer may also be included, if desired. Useful backings include, for example, those known in the art for making coated abrasive articles. Typically, the backing has two opposed major surfaces. The thickness of the backing generally ranges from about 0.02 to about 5 millimeters, desirably from about 0.05 to about 2.5 millimeters, and more desirably from about 0.1 to about 0.4 millimeter, although thicknesses outside of these ranges may also be useful. Exemplary backings include: dense nonwoven fabrics (for example, including needletacked, meltspun, spunbonded, hydroentangled, or meltblown nonwoven fabrics), knitted, stitchbonded, and/or woven fabrics; scrims; polymer films; treated versions thereof and combinations of two or more of these materials.

Fabric backings can be made from any known fibers, whether natural, synthetic or a blend of natural and synthetic fibers. Examples of useful fiber materials include fibers or yarns comprising polyester (for example, polyethylene terephthalate), polyamide (for example, hexamethylene adipamide, polycaprolactam), polypropylene, acrylic (formed from a polymer of acrylonitrile), cellulose acetate, polyvinylidene chloride-vinyl chloride copolymers, vinyl chloride-acrylonitrile copolymers, graphite, polyimide, silk, cotton, linen, jute, hemp, or rayon. Useful fibers may be of virgin materials or of recycled or waste materials reclaimed from garment cuttings, carpet manufacturing, fiber manufacturing, or textile processing, for example. Useful fibers may be homogenous or a composite such as a bicomponent fiber (for example, a co-spun sheath-core fiber). The fibers may be tensilized and crimped, but may also be continuous filaments such as those formed by an extrusion process.

The thickness of the backing generally ranges from about 0.02 to about 5 millimeters, desirably from about 0.05 to about 2.5 millimeters, and more desirably from about 0.1 to about 0.4 millimeter, although thicknesses outside of these ranges may also be useful, for example, depending on the intended use. Generally, the strength of the backing should be sufficient to resist tearing or other damage during abrading processes. The thickness and smoothness of the backing should also be suitable to provide the desired thickness and smoothness of the coated abrasive article; for example, depending on the intended application or use of the coated abrasive article.

The fabric backing may have any basis weight; typically, in a range of from 100 to 1000 grams per square meter (gsm), more typically 450 to 600 gsm, and even more typically 450 to 575 gsm. The fabric backing typically has good flexibility; however, this is not a requirement. To promote adhesion of binder resins to the fabric backing, one or more surfaces of the backing may be modified by known methods including corona discharge, ultraviolet light exposure, electron beam exposure, flame discharge, and/or scuffing.

Heat energy is commonly applied to advance curing of the thermosetting resins (e.g., size layer precursor or phenolic resin composition); however, other sources of energy (e.g., microwave radiation, infrared light, ultraviolet light, visible light, may also be used). The selection will generally be dictated by the particular resin system selected.

Useful abrasive particles may be the result of a crushing operation (e.g., crushed abrasive particles that have been sorted for shape and size) or the result of a shaping operation (i.e., shaped abrasive particles) in which an abrasive precursor material is shaped (e.g., molded), dried, and converted to ceramic material. Combinations of abrasive particles resulting from crushing with abrasive particles resulting from a shaping operation may also be used. The abrasive particles may be in the form of, for example, individual particles, agglomerates, composite particles, and mixtures thereof.

The abrasive particles should have sufficient hardness and surface roughness to function as crushed abrasive particles in abrading processes. Preferably, the abrasive particles have a Mohs hardness of at least 4, at least 5, at least 6, at least 7, or even at least 8.

Suitable abrasive particles include, for example, crushed abrasive particles comprising fused aluminum oxide, heat-treated aluminum oxide, white fused aluminum oxide, ceramic aluminum oxide materials such as those commercially available as 3M CERAMIC ABRASIVE GRAIN from 3M Company, St. Paul, Minnesota, brown aluminum oxide, blue aluminum oxide, silicon carbide (including green silicon carbide), titanium diboride, boron carbide, tungsten carbide, garnet, titanium carbide, diamond, cubic boron nitride, garnet, fused alumina zirconia, iron oxide, chromia, zirconia, titania, tin oxide, quartz, feldspar, flint, emery, sol-gel-derived ceramic (e.g., alpha alumina), and combinations thereof. Examples of sol-gel-derived abrasive particles from which the abrasive particles can be isolated, and methods for their preparation can be found, in U.S. Pat. No. 4,314,827 (Leitheiser et al.); U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the abrasive particles could comprise abrasive agglomerates such, for example, as those described in U.S. Pat. No. 4,652,275 (Bloecher et al.) or U.S. Pat. No. 4,799,939 (Bloecher et al.). In some embodiments, the abrasive particles may be surface-treated with a coupling agent (e.g., an organosilane coupling agent) or other physical treatment (e.g., iron oxide or titanium oxide) to enhance adhesion of the crushed abrasive particles to the binder. The abrasive particles may be treated before combining them with the binder, or they may be surface treated in situ by including a coupling agent to the binder.

In some embodiments, the abrasive particles may be selected to have a length and/or width in a range of from 0.1 micrometers to 3.5 millimeters (mm), more typically 0.05 mm to 3.0 mm, and more typically 0.1 mm to 2.6 mm, although other lengths and widths may also be used.

The abrasive particles may be selected to have a thickness in a range of from 0.1 micrometer to 1.6 mm, more typically from 1 micrometer to 1.2 mm, although other thicknesses may be used. In some embodiments, abrasive particles may have an aspect ratio (length to thickness) of at least 2, 3, 4, 5, 6, or more.

Typically, crushed abrasive particles are independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). Such industry accepted grading standards include, for example: ANSI 4, ANSI 6, ANSI 8, ANSI 16, ANSI 24, ANSI 30, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600; FEPA P8, FEPA P12, FEPA P16, FEPA P24, FEPA P30, FEPA P36, FEPA P40, FEPA P50, FEPA P60, FEPA P80, FEPA P100, FEPA P120, FEPA P150, FEPA P180, FEPA P220, FEPA P320, FEPA P400, FEPA P500, FEPA P600, FEPA P800, FEPA P1000, FEPA P1200; FEPA F8, FEPA F12, FEPA F16, and FEPA F24; and JIS 8, JIS 12, JIS 16, JIS 24, JIS 36, JIS 46, JIS 54, JIS 60, JIS 80, JIS 100, JIS 150, JIS 180, JIS 220, JIS 240, JIS 280, JIS 320, JIS 360, JIS 400, JIS 400, JIS 600, JIS 800, JIS 1000, JIS 1500, JIS 2500, JIS 4000, JIS 6000, JIS 8000, and JIS 10,000. More typically, the crushed aluminum oxide particles and the non-seeded sol-gel derived alumina-based abrasive particles are independently sized to ANSI 60 and 80, or FEPA F36, F46, F54 and F60, or FEPA P60 and P80 grading standards.

Alternatively, the abrasive particles can be graded to a nominal screened grade using U.S.A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the shaped abrasive particles pass through a test sieve meeting ASTM E-11 specifications for the number 18 sieve and are retained on a test sieve meeting ASTM E-11 specifications for the number 20 sieve. In one embodiment, the shaped abrasive particles have a particle size such that most of the particles pass through an 18 mesh test sieve and can be retained on a 20, 25, 30, 35, 40, 45, or 50 mesh test sieve. In various embodiments, the shaped abrasive particles can have a nominal screened grade comprising: −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635. Alternatively, a custom mesh size could be used such as −90+100.

A grinding aid is a material that has a significant effect on the chemical and physical processes of abrading, which results in improved performance. Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium.

Other miscellaneous grinding aids include sulfur, organic sulfur compounds, graphite, and metallic sulfides. A combination of different grinding aids may be used, and in some instances this may produce a synergistic effect.

Grinding aids can be particularly useful in coated abrasives. In coated abrasive articles, grinding aid is typically used in a supersize coat, which is applied over the surface of the abrasive particles. Sometimes, however, the grinding aid is added to the size coat. Typically, the amount of grinding aid incorporated into coated abrasive articles is about 50-300 grams per square meter ($g/m^2$), preferably about 80-160 $g/m^2$.

Further details regarding coated abrasive articles and methods of their manufacture can be found, for example, in U.S. Pat. No. 4,734,104 (Broberg); U.S. Pat. No. 4,737,163 (Larkey); U.S. Pat. No. 5,203,884 (Buchanan et al.); U.S. Pat. No. 5,152,917 (Pieper et al.); U.S. Pat. No. 5,378,251 (Culler et al.); U.S. Pat. No. 5,436,063 (Follett et al.); U.S. Pat. No. 5,496,386 (Broberg et al.); U.S. Pat. No. 5,609,706 (Benedict et al.); U.S. Pat. No. 5,520,711 (Helmin); U.S. Pat. No. 5,961,674 (Gagliardi et al.), and U.S. Pat. No. 5,975,988 (Christianson).

Preferably, the abrasive particles comprise ceramic abrasive particles such as, for example, sol-gel-derived polycrystalline alpha alumina particles. Ceramic abrasive particles composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U.S. Publ. Pat. Appln. Nos. 2009/0165394 A1 (Culler et al.) and 2009/0169816 A1 (Erickson et al.). Further details concerning methods of making sol-gel-derived abrasive particles can be found in, for example, U.S. Pat. No. 4,314,827 (Leitheiser); U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. Publ. Pat. Appln. No. 2009/0165394 A1 (Culler et al.).

In some preferred embodiments, the abrasive particles may be shaped abrasive particles as described in U.S. Pat. No. 5,201,916 (Berg); U.S. Pat. No. 5,366,523 (Rowenhorst (Re 35,570)); and U.S. Pat. No. 5,984,988 (Berg). As used herein, the term "shaped abrasive particle", means a ceramic abrasive particle with at least a portion of the abrasive particle having a predetermined shape that is replicated from a mold cavity used to form the shaped precursor abrasive particle. Except in the case of abrasive shards (e.g., as described in U.S. patent publication U.S. 2009/0169816, the shaped abrasive particle will generally have a predetermined geometric shape that substantially replicates the mold cavity that was used to form the shaped abrasive particle. Shaped abrasive particle as used herein excludes randomly sized abrasive particles obtained by a mechanical crushing operation.

U.S. Pat. No. 8,034,137 (Erickson et al.) describes alumina abrasive particles that have been formed in a specific shape, then crushed to form shards that retain a portion of their original shape features. In some embodiments, shaped alpha alumina particles are precisely-shaped (i.e., the particles have shapes that are at least partially determined by the shapes of cavities in a production tool used to make them). Details concerning such abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris).

Figure 3A:
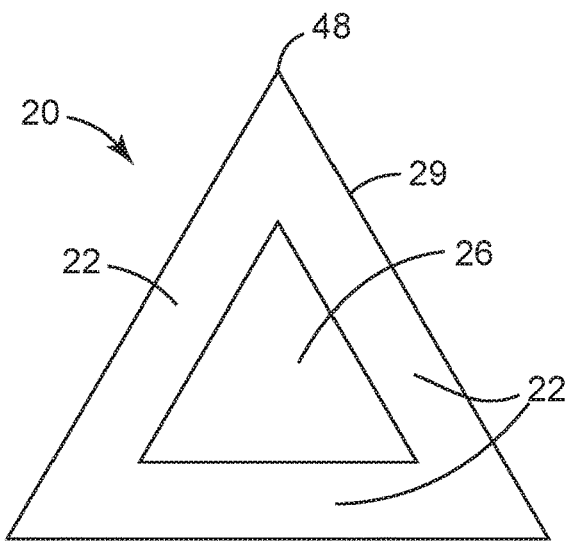
FIGS. 3A and 3B illustrate a top view and a side view of one embodiment of a shaped abrasive particle.
Figure 3B:
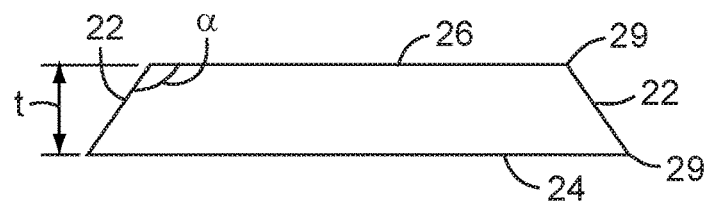

One particularly useful precisely-shaped abrasive particle shape is that of a truncated triangular pyramid with sloping sidewalls; for example as set forth in the above cited references, such as shown in FIGS. 3A and 3B.

Referring to FIGS. 3A, 3B, and 4 an exemplary shaped abrasive particle 20 with a sloping sidewall 22 is illustrated. The material from which the shaped abrasive particle 20 with a sloping sidewall 22 is made comprises a ceramic and specifically in one embodiment alpha alumina. Alpha alumina particles can be made from a dispersion of aluminum oxide monohydrate that is gelled, molded to shape, dried to retain the shape, calcined, and then sintered. The shaped abrasive particle's shape is retained without the need for a binder to form an agglomerate comprising abrasive particles in a binder that are then formed into a shaped structure.

In general, the shaped abrasive particles 20 with a sloping sidewall 22 comprise thin bodies having a first face 24, and a second face 26 and having a thickness t. The first face 24 and the second face 26 are connected to each other by at least one sloping sidewall 22. In some embodiments, more than one sloping sidewall 22 can be present and the slope or angle for each sloping sidewall 22 may be the same as shown in FIG. 3A or different.

In some embodiments, the first face 24 is substantially planar, the second face 26 is substantially planar, or both faces are substantially planar. Alternatively, the faces could be concave or convex as discussed in more detail in U.S. patent publication 2010/0151195 entitled "Dish-Shaped Abrasive Particles With A Recessed Surface", filed on Dec. 17, 2008. Additionally, an opening or aperture through the faces could be present as discussed in more detail in U.S. patent publication 2010/0151201 entitled "Shaped Abrasive Particles With An Opening", filed on Dec. 17, 2008.

In one embodiment, the first face 24 and the second face 26 are substantially parallel to each other. In other embodiments, the first face 24 and second face 26 can be nonparallel such that one face is sloped with respect to the other face and imaginary lines tangent to each face would intersect at a point. The sloping sidewall 22 of the shaped abrasive particle 20 with a sloping sidewall 22 can vary and it generally forms the perimeter 29 of the first face 24 and the second face 26. In one embodiment, the perimeter 29 of the first face 24 and second face 26 is selected to be a geometric shape, and the first face 24 and the second face 26 are selected to have the same geometric shape, although, they differ in size with one face being larger than the other face. In one embodiment, the perimeter 29 of first face 24 and the perimeter 29 of the second face 26 was a triangular shape that is illustrated.

Referring to FIG. 3B, a draft angle, symbol alpha, between the second face 26 and the sloping sidewall 22 of the shaped abrasive particle 20 can be varied to change the relative sizes of each face. In various embodiments of the invention, the draft angle can be between about 90 degrees to about 130 degrees, or between about 95 degrees to about 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees. As discussed in U.S. patent publication 2010/0151196 entitled "Shaped Abrasive Particles With A Sloping Sidewall" filed on Dec. 17, 2008, specific ranges for the draft angle have been found to produce surprising increases in the grinding performance of coated abrasive articles made from the shaped abrasive particles with a sloping sidewall.

Figure 3C:
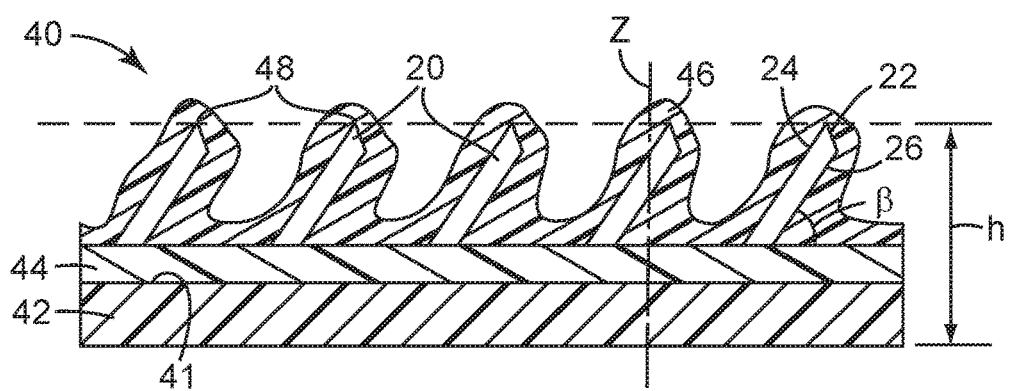
FIG. 3C illustrates a side view of a coated abrasive article.

Referring now to FIG. 3C, a coated abrasive article 40 is shown having a first major surface 41 of a backing 42 covered by an abrasive layer. The abrasive layer comprises a make coat 44, and a plurality of shaped abrasive particles 20 with a sloping sidewall 22 attached to the backing 42 by the make coat 44. A size coat 46 is applied to further attach or adhere the shaped abrasive particles 20 with a sloping sidewall 22 to the backing 42.

As seen, the majority of the shaped abrasive particles 20 with a sloping sidewall 22 are tipped or leaning to one side. This results in the majority of the shaped abrasive particles 20 with a sloping sidewall 22 having an orientation angle symbol beta less than 90 degrees relative to the first major surface 41 of the backing 42. As seen, once the shaped abrasive particles with a sloping sidewall are applied and allowed to lean onto the sloping sidewall, the very tips 48 of the shaped abrasive particles have generally the same height, h.

In various embodiments of the invention, greater than 50, 60, 70, 80, or 90 percent of the shaped abrasive particles in the coated abrasive article having an open or closed coat abrasive layer are tipped or leaning having an orientation angle beta of less than 90 degrees. Precision aperture screens can be used to evenly space the shaped abrasive particles while still allowing for them to tip or lean at significantly higher abrasive particle densities in the abrasive layer that approach or equal closed coat densities.

Without wishing to be bound by theory, it is believed that an orientation angle beta of less than 90 degrees results in enhanced cutting performance of the shaped abrasive particles with a sloping sidewall. In various embodiments of the invention, the orientation angle beta for at least a majority of the shaped abrasive particles with a sloping sidewall in an abrasive layer of a coated abrasive article can be between about 50 degrees to about 85 degrees, or between about 55 degrees to about 85 degrees, or between about 60 degrees to about 85 degrees, or between about 65 degrees to about 85 degrees, or between about 70 degrees to about 85 degrees, or between about 75 degrees to about 85 degrees, or between about 80 degrees to about 85 degrees.

The shaped abrasive particles 20 can have various volumetric aspect ratios. The volumetric aspect ratio is defined as the ratio of the maximum cross sectional area passing through the centroid of a volume divided by the minimum cross sectional area passing through the centroid. For some shapes, the maximum or minimum cross sectional area may be a plane tipped, angled, or tilted with respect to the external geometry of the shape. For example, a sphere would have a volumetric aspect ratio of 1.000 while a cube will have a volumetric aspect ratio of 1.414. A shaped abrasive particle in the form of an equilateral triangle having each side equal to length A and a uniform thickness equal to A will have a volumetric aspect ratio of 1.54, and if the uniform thickness is reduced to 0.25 A, the volumetric aspect ratio is increased to 2.64. It is believed that shaped abrasive particles having a larger volumetric aspect ratio have enhanced cutting performance. In various embodiments of the invention, the volumetric aspect ratio for the shaped abrasive particles with a sloping sidewall can be greater than about 1.15, or greater than about 1.50, or greater than about 2.0, or between about 1.15 to about 10.0, or between about 1.20 to about 5.0, or between about 1.30 to about 3.0.

Other suitable shaped abrasive particles are disclosed in U.S. Pat. Nos. 8,034,137; 8,764,865; U.S. Patent Publication No. 2010/0319269; U.S. Pat. Nos. 9,447,311; 9,573,250; and U.S. patent application 61/370,497 filed on Aug. 4, 2010 entitled "Intersecting Plate Shaped Abrasive Particles."

Referring to FIG. 3C, a coated abrasive article 40 comprises a backing 42 having a first layer of binder, hereinafter referred to as the make coat 44, applied over a first major surface 41 of backing 42. Attached or partially embedded in the make coat 44 are a plurality of formed ceramic abrasive particles which, in one embodiment, comprises shaped abrasive particles 20 with a sloping sidewall 22 forming an abrasive layer. Over the shaped abrasive particles 20 with a sloping sidewall 22 is a second layer of binder, hereinafter referred to as the size coat 46. The purpose of make coat 44 is to secure shaped abrasive particles 20 with the sloping sidewall 22 to backing 42 and the purpose of size coat 46 is to reinforce shaped abrasive particles 20 with a sloping sidewall 22. The majority of the shaped abrasive particles 20 with a sloping sidewall 22 are oriented such that the tip 48 or vertex points away from the backing 42 and the shaped abrasive particles are resting on the sloping sidewall 22 and tipped or leaning as shown.

Each of the plurality of formed ceramic abrasive particles can have a specified z-direction rotational orientation about a z-axis passing through the formed ceramic abrasive particle and through the backing 42 at a 90 degree angle to the backing as shown in FIG. 3C. The formed abrasive particles are orientated with a surface feature, such as a substantially planar surface of the first face 24 or the second face 26, rotated into a specified angular position about the z-axis. The specified z-direction rotational orientation in the coated abrasive article occurs more frequently than would occur by a random z-directional rotational orientation of the surface feature due to electrostatic coating or drop coating of the formed abrasive particles when forming the abrasive layer. As such, by controlling the z-direction rotational orientation of a significantly large number of the formed ceramic abrasive particles, the cut rate, finish, or both of the coated abrasive article can be varied from those manufactured using an electrostatic coating method. In various embodiments of the invention, at least 50, 51, 55, 60, 65, 70, 75, 80, 85, 90, 95, or 99 percent of the formed ceramic abrasive particles in the abrasive layer can have a specified z-direction rotational orientation which does not occur randomly and which can be substantially the same for all of the aligned particles. In other embodiments, about 50 percent of the formed ceramic abrasive particles can be aligned in a first direction and about 50 percent of the formed ceramic abrasive particles can be aligned in a second direction. In one embodiment, the first direction is substantially orthogonal to the second direction.

The surface feature is formed during the molding, extrusion, screen printing or other process that shapes the formed ceramic abrasive particle. Non-limiting surface features can include: a substantially planer surface; a substantially planar surface having a triangular, rectangular, hexagonal, or polygonal perimeter; a concave surface; a convex surface; a vertex; an aperture; a ridge; a line or a plurality of lines; a protrusion; or a depression. The surface feature is often chosen to change the cut rate, reduce wear of the formed abrasive particles, or change the resulting finish. Often, the surface feature will be an edge, a plane, or a point and the z-direction rotational orientation of that feature in the abrasive layer will be selected taking into consideration the motion of the abrasive layer, the motion of the work piece, and the angle of the abrasive layer relative to the workpiece surface during grinding.

Various patterns of the formed ceramic abrasive particles in the abrasive layer of coated abrasive discs, sheets, or belts can be made. Some of such patterns are depicted in US2013/0344786; incorporated herein by reference.

Materials that can be made into formed ceramic abrasive particles include physical precursors such as finely divided particles of known ceramic materials such as alpha alumina, silicon carbide, alumina/zirconia and boron carbide. Also included are chemical and/or morphological precursors such as aluminum trihydrate, boehmite, gamma alumina and other transitional aluminas and bauxite. The most useful of the above are typically based on alumina and its physical or chemical precursors. It is to be understood however that the invention is not so limited but is capable of being adapted for use with a plurality of different precursor ceramic materials.

Suitable methods for making formed ceramic abrasive particles are disclosed in: U.S. patent publication 2009/0165394 filed on Dec. 17, 2008 entitled "Method Of Making Abrasive Shards, Shaped Abrasive Particles With An Opening, Or Dish-shaped Abrasive Particles"; U.S. patent application Ser. No. 61/289,188 filed on Dec. 22, 2009 entitled "Transfer Assisted Screen Printing Method Of Making Shaped Abrasive Particles And The Resulting Shaped Abrasive Particles"; and in the patents referenced in the definition of formed ceramic abrasive particle.

Particles suitable for mixing with the shaped abrasive particles 20 include conventional abrasive grains, diluent grains, or erodable agglomerates, such as those described in U.S. Pat. Nos. 4,799,939 and 5,078,753. Representative examples of conventional abrasive grains include fused aluminum oxide, silicon carbide, garnet, fused alumina zirconia, cubic boron nitride, diamond, and the like. Representative examples of diluent grains include marble, gypsum, and glass. Blends of differently shaped abrasive particles 20 with a sloping sidewall 22 (triangles and squares for example) or blends of shaped abrasive particles 20 with different draft angles (for example particles having an 98 degree draft angle mixed with particles having a 120 degree draft angle) can be used in abrasive articles.

Surface coatings on the (e.g. shaped) abrasive particles may be used to improve the adhesion between the abrasive particles and a binder material, or to aid in electrostatic deposition of the abrasive particles. In one embodiment, surface coatings as described in U.S. Pat. No. 5,352,254 (Celikkaya) in an amount of 0.1 to 2 percent surface coating to abrasive particle weight may be used. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.). Additionally, the surface coating may prevent shaped abrasive particles from capping. Capping is the term to describe the phenomenon where metal particles from the workpiece being abraded become welded to the tops of the abrasive particles. Surface coatings to perform the above functions are known to those of skill in the art.

Nonwoven abrasive articles typically include an open porous lofty fiber web having abrasive particles distributed throughout the structure and adherently bonded therein by a resole-phenolic-resin-based binder material according to the present disclosure. Examples of filaments include polyester fibers, polyamide fibers, and polyaramid fibers.

Figure 2A:
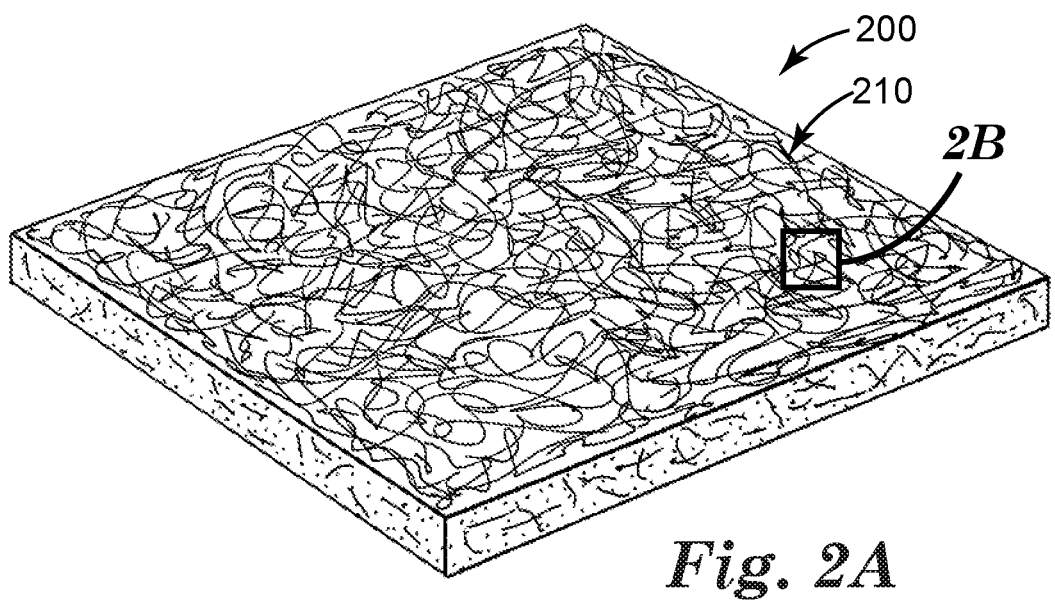
FIG. 2A is a perspective view of exemplary nonwoven abrasive article 200 according to the present disclosure.
Figure 2B:
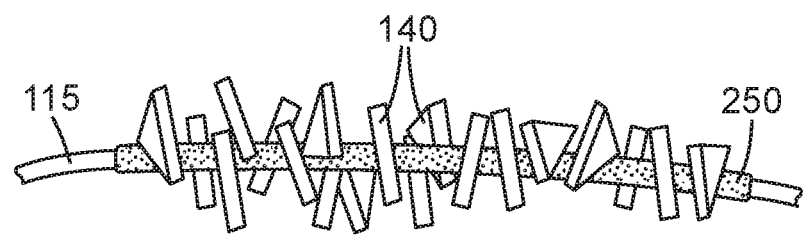
FIG. 2B is an enlarged view of region 2B of nonwoven abrasive article 200 shown in FIG. 2A.

An exemplary embodiment of a nonwoven abrasive article 200 is shown in FIGS. 2A and 2B. Referring now to FIGS. 2A and 2B, lofty open low-density fibrous web 210 is formed of entangled fibers 215. Abrasive particles 140 are secured to fibrous web 210 on exposed surfaces of fibers 215 by binder material 250, which also binds fibers 215 together at points where they contact one another, resulting in cutting points 150 being outwardly oriented relative to fibers 215.

Nonwoven fiber webs suitable for use are known in the abrasives art. Typically, the nonwoven fiber web comprises an entangled web of fibers. The fibers may comprise continuous fiber, staple fiber, or a combination thereof. For example, the fiber web may comprise staple fibers having a length of at least about 20 millimeters (mm), at least about 30 mm, or at least about 40 mm, and less than about 110 mm, less than about 85 mm, or less than about 65 mm, although shorter and longer fibers (e.g., continuous filaments) may also be useful. The fibers may have a fineness or linear density of at least about 1.7 decitex (dtex, i.e., grams/10000 meters), at least about 6 dtex, or at least about 17 dtex, and less than about 560 dtex, less than about 280 dtex, or less than about 120 dtex, although fibers having lesser and/or greater linear densities may also be useful. Mixtures of fibers with differing linear densities may be useful, for example, to provide an abrasive article that upon use will result in a specifically preferred surface finish. If a spunbond nonwoven is used, the filaments may be of substantially larger diameter, for example, up to 2 mm or more in diameter.

The fiber web may be made, for example, by conventional air laid, carded, stitch bonded, spun bonded, wet laid, and/or melt blown procedures. Air laid fiber webs may be prepared using equipment such as, for example, that available under the trade designation RANDO WEBBER from Rando Machine Company of Macedon, New York.

Nonwoven fiber webs are typically selected to be compatible with adhering binders and abrasive particles while also being compatible with other components of the article, and typically can withstand processing conditions (e.g., temperatures) such as those employed during application and curing of the curable binder precursor. The fibers may be chosen to affect properties of the abrasive article such as, for example, flexibility, elasticity, durability or longevity, abrasiveness, and finishing properties. Examples of fibers that may be suitable include natural fibers, synthetic fibers, and mixtures of natural and/or synthetic fibers. Examples of synthetic fibers include those made from polyester (e.g., polyethylene terephthalate), nylon (e.g., hexamethylene adipamide, polycaprolactam), polypropylene, acrylonitrile (i.e., acrylic), rayon, cellulose acetate, polyvinylidene chloride-vinyl chloride copolymers, and vinyl chloride-acrylonitrile copolymers. Examples of suitable natural fibers include cotton, wool, jute, and hemp. The fiber may be of virgin material or of recycled or waste material, for example, reclaimed from garment cuttings, carpet manufacturing, fiber manufacturing, or textile processing. The fiber may be homogenous or a composite such as a bicomponent fiber (e.g., a co-spun sheath-core fiber). The fibers may be tensilized and crimped, but may also be continuous filaments such as those formed by an extrusion process. Combinations of fibers may also be used.

Prior to coating and/or impregnation with a binder precursor composition, the nonwoven fiber web typically has a weight per unit area (i.e., basis weight) of at least about 50 grams per square meter (gsm), at least about 100 gsm, or at least about 150 gsm; and/or less than about 600 gsm, less than about 500 gsm, or less than about 400 gsm, as measured prior to any coating (e.g., with the curable binder precursor or optional pre-bond resin), although greater and lesser basis weights may also be used. In addition, prior to impregnation with the curable binder precursor, the fiber web typically has a thickness of at least about 3 mm, at least about 6 mm, or at least about 10 mm; and/or less than about 100 mm, less than about 50 mm, or less than about 25 mm, although greater and lesser thicknesses may also be useful.

Frequently, as known in the abrasives art, it is useful to apply a prebond resin to the nonwoven fiber web prior to coating with the curable binder precursor. The prebond resin serves, for example, to help maintain the nonwoven fiber web integrity during handling, and may also facilitate bonding of the urethane binder to the nonwoven fiber web. Examples of prebond resins include phenolic resins, urethane resins, hide glue, acrylic resins, urea-formaldehyde resins, melamine-formaldehyde resins, epoxy resins, and combinations thereof. The amount of pre-bond resin used in this manner is typically adjusted toward the minimum amount consistent with bonding the fibers together at their points of crossing contact. In those cases, wherein the nonwoven fiber web includes thermally bondable fibers, thermal bonding of the nonwoven fiber web may also be helpful to maintain web integrity during processing.

In those nonwoven abrasive articles including a lofty open nonwoven fiber web (e.g., hand pads, and surface conditioning discs and belts, flap brushes, or nonwoven abrasive webs used to make unitized or convolute abrasive wheels) many interstices between adjacent fibers that are substantially unfilled by the binder and abrasive particles, resulting in a composite structure of extremely low density having a network on many relatively large intercommunicated voids. The resulting lightweight, lofty, extremely open fibrous construction is essentially non-clogging and non-filling in nature, particularly when used in conjunction with liquids such as water and oils. These structures also can be readily cleaned upon simple flushing with a cleansing liquid, dried, and left for substantial periods of time, and then reused. Towards these ends, the voids in these nonwoven abrasive articles may make up at least about 75 percent, and preferably more, of the total space occupied by the composite structure.

One method of making nonwoven abrasive articles according to the present invention includes the steps in the following order: applying a prebond coating to the nonwoven fiber web (e.g., by roll-coating or spray coating), curing the prebond coating, impregnating the nonwoven fiber web with a make layer precursor that is a curable tacky binder material precursor according to the present disclosure (e.g., by roll-coating or spray coating), applying abrasive particles to the make layer precursor, at least partially curing make layer precursor, and then optionally applying a size layer precursor (e.g., as described herein above), and curing it and the make layer precursor (e.g., as described hereinabove), if necessary.

Further details regarding nonwoven abrasive articles and methods for their manufacture can be found, for example, in U.S. Pat. No. 2,958,593 (Hoover et al.); U.S. Pat. No. 4,227,350 (Fitzer); U.S. Pat. No. 4,991,362 (Heyer et al.); U.S. Pat. No. 5,712,210 (Windisch et al.); U.S. Pat. No. 5,591,239 (Edblom et al.); U.S. Pat. No. 5,681,361 (Sanders); U.S. Pat. No. 5,858,140 (Berger et al.); U.S. Pat. No. 5,928,070 (Lux); and U.S. Pat. No. 6,017,831 (Beardsley et al.).

In some embodiments, the substrate comprises a fiber scrim, for example, in the case of screen abrasives, or if included in bonded abrasives such as, for example, cutoff wheels and depressed center grinding wheels. Suitable fiber scrims may include woven, and knitted cloths, for example, which may include inorganic and/or organic fibers. For example, the fibers in the scrim may include wire, ceramic fiber, glass fiber (for example, fiberglass), and organic fibers (for example, natural and/or synthetic organic fibers). Examples of organic fibers include cotton fibers, jute fibers, and canvas fibers. Examples of synthetic fibers include nylon fibers, rayon fibers, polyester fibers, and polyimide fibers).

Abrasive articles according to the present disclosure are useful, for example, for abrading a workpiece. Such a method may comprise: frictionally contacting an abrasive articles according to the present disclosure with a surface of the workpiece, and moving at least one of the abrasive article and the surface of the workpiece relative to the other to abrade at least a portion of the surface of the workpiece. Methods for abrading with abrasive articles according to the present disclosure include, for example, snagging (i.e., high-pressure high stock removal) to polishing (e.g., polishing medical implants with coated abrasive belts), wherein the latter is typically done with finer grades (e.g., ANSI 220 and finer) of abrasive particles. The size of the abrasive particles used for a particular abrading application will be apparent to those skilled in the art.

Abrading may be carried out dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Examples of workpieces include aluminum metal, carbon steels, mild steels (e.g., 1018 mild steel and 1045 mild steel), tool steels, stainless steel, hardened steel, titanium, glass, ceramics, wood, wood-like materials (e.g., plywood and particle board), paint, painted surfaces, and organic coated surfaces. The applied force during abrading typically ranges from about 1 to about 100 kilograms (kg), although other pressures can also be used.

EXAMPLES

Unless otherwise noted, all parts, percentages, ratios, etc. in the Examples and the rest of the specification are by weight. Unless stated otherwise, all other reagents were obtained, or are available from fine chemical vendors such as Sigma-Aldrich Company, St. Louis, Missouri, or may be synthesized by known methods.

Material abbreviations used in the Examples are listed in Table 1 below.

TABLE 1

Materials List

| Abbreviation | Description | Vendor |
| --- | --- | --- |
| EOEOEA | 2-(2-Ethoxyethoxy)ethyl acrylate Tg = −60° C. | Alfa Aesar, Haverhill, MA |
| DMAm | Dimethylacrylamide, Tg = 89° C. | TCI America, Portland, OR |
| MAA | Methacrylic acid anionic monomer Tg = 228° C. | Alfa Aesar, Haverhill, MA |

TABLE 1-continued

Materials List

| Abbreviation | Description | Vendor |
|---|---|---|
| DMAPAm | N-[3-(Dimethylamino)propyl]-acrylamide cationic monomer, Tg = 19° C. | TCI America, Portland, OR |
| AMPS | 2-acrylamido-2-methyl-propanesulfonic acid cationic monomer, Tg = 195° C. | Alfa Aesar, Haverhill, MA |
| EOEOEAIm | Adduct of imidazole and 2-(2-ethoxyethoxy) ethyl acrylate. Synthesis is described below. | |
| IOTG | Isooctyl thioglycolate | TCI America, Portland, OR |
| I651 | 2,2-Dimethoxy-2-phenylactophenone obtained under the trade designation IRGACURE 651 | Thermofisher Acros Organics, Geel, Belgium |
| PF | Resole resin (75 wt. % in water), a formaldehyde:phenol (molar ratio of 1.5:1 to 2.1:1) condensate catalyzed by 1 to 5% metal hydroxide | Georgia Pacific, Atlanta, GA |
| Q325 | Calcium carbonate, 13 micrometer average particle size | Huber Engineered Materials, Atlanta, GA |
| SAP1 | Shaped abrasive particles were prepared according to the disclosure of U. S. Pat. No. 8,142,531 (Adefris et al). The shaped abrasive particles were prepared by molding alumina sol gel in equilateral triangle-shaped polypropylene mold cavities. After drying and firing, the resulting shaped abrasive particles, which were shaped as truncated triangular pyramids, were about 1.4 mm (side length) × 0.35 mm (thickness), with a draft angle approximately 98 degrees. | 3M, St. Paul, MN |
| SAP2 | SAP2 was prepared in a similar manner to SAP1 only using smaller equilateral triangle-shaped polypropylene mold cavities. After drying and firing, the resulting shaped abrasive particles, which were shaped as truncated triangular pyramids, were about 0.52 mm (side length) × 0.15 mm (thickness), with a draft angle approximately 98 degrees. | 3M, St. Paul, MN |
| FIL1 | Calcium silicate obtained under the trade designation M400 WOLLASTOCOAT | NYCO, Willsboro, NY |
| FIL2 | Cryolite obtained under the trade designation CRYOLITE RTN-C | FREEBEE A'S, Ullerslev, Denmark |
| RIO | Red iron oxide pigment obtained under the trade designation KROMA RO-3097 | Elementis, East Saint Louis, IL |

Viscoelastic Characterization

Samples for evaluation were prepared by hot-pressing 5 gram (g) aliquots of the phenolic-copolymer mixtures at 60° C. for 1 minute in a hydraulic press (Model 4386 Carver, Inc., Wabash, IN) between two poly(ethylene terephthalate) release liners (T10, Loparex, Cary, NC) to a thickness of approximately 1 millimeter (mm). A circular 26 mm diameter punch was used to cut test specimens from the pressed sample.

The viscoelastic characteristics of the phenolic copolymer mixtures were characterized by small amplitude oscillatory rheometry using a TA Instruments Discovery Hybrid Rheometer 3 (TA Instruments, New Castle, DE) equipped with steel 25 mm parallel plate geometry. Environmental control was achieved using an ETC radiant heat oven and an ACS-3 compressed air chilling system using $N_2$ as the compressed gas source. For all oscillatory experiments, a strain of 1% was used to ensure linear stress-strain response of the compositions. The time dependent behavior of the mixtures was investigated using frequency sweep experiments performed at 25° C. using a logarithmic set of frequencies from 0.01-100 Hertz (Hz) selecting 10 individual frequencies per decade. The temperature dependent behavior of the mixtures was investigated at 1 Hz frequency and continuously increasing the temperature at 2° C./min from 0-80° C.

Polymer Size Characterization by Dynamic Light Scattering (DLS)

Copolymers were dissolved into 0.510 molar aqueous lithium bromide solution to generate solutions that were approximately 2.00% polymer by mass. 4 mL aliquots were placed into polystyrene cuvettes (1.0×1.0×4.5 cm) and capped to avoid water evaporation. The hydrodynamic radius of the copolymers in solution was determined by dynamic light scattering (DLS) using a NanoBrook 90plus PALS instrument (Brookhaven Instruments Corporation, Holtsville, NY) equipped with a Brookhaven TuboCorr autocorrelator and 659 nm diode laser. Samples were equilibrated at 20.0° C. for 300 seconds before scattering data were acquired. Scattered light was detected at 90° from the incident beam for 600 seconds. Autocorrelation data were analyzed assuming uniform spherical particles and the CONTIN algorithm in the Particle Solutions software from Brookhaven Instruments Corporation. The translational diffusion coefficient ($D_t$) and effective particle size ($D_h$) were extracted from the analysis. Diffusion averaged polyvinyl alcohol equivalent molecular weights ($M_D$) were calculated the Mark-Houwink-Sakurada equation:

$$D_t = K \times M_D^a$$

K and a are empirically derived parameters for polyvinyl alcohol in pure water at 20.0° C. the values used for K and a are $5.50 \times 10^{-4}$ and $-0.68$ respectively.

Belt Grinding Test Method

Abrasive belt performance was evaluated using a belt grinding test conducted on 10.16 centimeter (cm) by 91.44 cm belts converted from coated abrasives samples. The workpiece was a 304 stainless steel bar on which the surface to be abraded measured 1.9 cm by 1.9 cm. A 20.3 cm diameter 70 durometer rubber, 1:1 land to groove ratio, serrated contact wheel was used. The belt was run at 2750 revolutions per minute (rpm). The workpiece was applied to the center part of the belt at a normal force of 4.4 kilograms (kg). The test consisted of measuring the weight loss of the workpiece after 15 seconds of grinding. The workpiece would then be cooled and tested again. The test was concluded after 40 cycles. The total cut in grams was defined as total cut after 40 cycles and the belt wear was the belt weight loss after 40 cycles.

Abrasive Fiber Disc Performance Test Method

The grinding performance of the various discs was evaluated by grinding 1018 mild carbon steel using the following procedure. Seven inch (17.8 cm) diameter abrasive discs for evaluation were attached to a drive motor running at a constant rotational speed of 5000 rpm and fitted with a 7 inch (17.8 cm) ribbed disc pad face plate ("80516 medium gray ribbed" obtained from 3M Company, St. Paul, Minnesota). The grinder was activated and urged against an end face of a 1 inch×1 inch (2.54 cm×2.54 cm) pre-weighed 1018 steel bar under a controlled force. The workpiece was abraded under these conditions for 13-second grinding intervals (passes). Following each 13 second interval, the workpiece was cooled to room temperature and weighed to determine the cut of the abrasive operation. The test end point was determined at 20 cycles. Test results were reported as the incremental cut (g/cycle) for each interval.

Preparation of EOEOEAIm

The following procedure for the preparation of the imidazole-Michael adduct of 2-ethoxyethoxyethyl acrylate (3-imidazol-1-yl-propionic acid 2-ethoxyethoxyethyl ester) was modified from US2017/039181.

A 250 milliliter (mL) brown glass jar with a magnetic stir bar was charged with 2-(2-ethoxyethoxy) ethyl acrylate (189.18 g, 1.0001 mole (mol)) and imidazole (68.76 g, 1.010 mol). The jar was magnetically stirred at ambient temperature (~22° C.) until the imidazole dissolved, then the jar was placed in a 70° C. oil bath for 18 hours. The reaction product was a colorless, low viscosity oil.

Preparation of C12DMAPAm

A 250 mL brown glass jar with a magnetic stir bar was charged with N,N-dimethylaminopropyl acrylamide (15.64 g, 99.1 millimole (mmol)) and 1-Bromododecane (24.92 g, 99.99 mmol, 100). The jar was sealed with a screw cap and allowed to stir at 23° C. for 17 hours and placed in an oil bath set to 40° C. an additional 6 hours. The reaction product after cooling, was a colorless extremely viscous semisolid.

Preparatory Examples 1 to 6 (PE-1 to PE-7)

The following procedure for the preparation of the acrylic copolymers was modified from U.S. Pat. No. 5,804,610 (Hamer et al.). Solutions were prepared by combining the monomers and amounts as shown in Tables 2 and 3 in an amber glass jar and placing the jar on a roller mixer for 30 minutes to ensure a uniform solution. Each solution was then added to a package, measuring 15.5 cm×4.5 cm×0.5 cm and sealed on three sides, formed from an ethylene vinyl acetate-based film. The package with solution was heat sealed on its fourth side, immersed in a 16° C. water bath, and polymerized using UV light (UVA=16 minutes exposure with a total energy of 4512 mJ/cm$^2$). The resulting polymer was removed from package before further use. Chemical structures of PE-1, PE-2, and PE-3 were previously presented. Chemical structures of PE-4, PE-5, PE-6, and PE-7 are represented in Scheme 1.

TABLE 2

Formulations for Preparatory Examples 1-3 (PE-1, PE-2, and PE-3)

| MATERIAL | PE-1 | | PE-2 | | PE-3 | |
|---|---|---|---|---|---|---|
| | Mass, g (wt.-%) | Moles (Mole-%) | Mass, g (wt. %) | Moles (Mole-%) | Mass, g (wt. %) | Moles (Mole-%) |
| EOEOEA | 48.94 (31.71) | 0.26 (33.24) | | | | |
| DMAm | | | 52.56 (35.12) | 0.5302 (49.85) | | |
| MAA | | | | | 8.61 (36.87) | 0.1 (49.60) |
| DMAPAm | 24.38 (15.79) | 0.1561 (19.96) | 41.4 (27.66) | 0.265 (24.92) | | |
| DMAEA | | | | | 14.32 (61.33) | 0.1 (49.60) |
| AMPS | 53.89 (34.91) | 0.26 (33.24) | 54.95 (36.71) | 0.2651 (24.93) | | |
| EOEOEAIm | 26.66 (17.27) | 0.104 (13.30) | | | | |

TABLE 2-continued

Formulations for Preparatory Examples 1-3 (PE-1, PE-2, and PE-3)

| | PE-1 | | PE-2 | | PE-3 | |
|---|---|---|---|---|---|---|
| MATERIAL | Mass, g (wt.-%) | Moles (Mole-%) | Mass, g (wt. %) | Moles (Mole-%) | Mass, g (wt. %) | Moles (Mole-%) |
| IOTG | 0.14 (0.09) | 0.0007 (0.09) | 0.22 (0.15) | 0.0011 (0.10) | 0.1 (0.43) | 0.0005 (0.25) |
| I651 | 0.35 (0.23) | 0.0014 (0.18) | 0.54 (0.36) | 0.0021 (0.20) | 0.32 (1.37) | 0.001 (0.50) |
| Total | 154.36 | 0.7821 | 149.67 | 1.0635 | 23.35 | 0.2016 |

TABLE 3-continued

Formulations for Preparatory Examples 4-6 (PE-4 to PE-6)

| | PE-4 | | PE-5 | | PE-6 | |
|---|---|---|---|---|---|---|
| MATERIAL | Mass, g (wt.-%) | Moles (mole-%) | Mass, g (wt.-%) | Moles (mole-%) | Mass, g (wt.-%) | Moles (mole-%) |
| EOEOEA | 109.19 (71.93) | 0.5801 (49.86) | 50.01 (33.19) | 0.2657 (33.33) | | |
| DMAm | | | | | | |
| AA | 41.78 (27.52) | 0.5798 (49.84) | | | | |
| MAA | | | | | 30.12 (25.03) | 0.35 (49.84) |
| DMAPAm | | | 50.01 (33.19) | 0.3201 (40.15) | | |
| AMPS | | | | | | |
| EOEOEAIm | | | | | 89.72 (74.56) | 0.3501 (49.86) |
| IOTG | 0.23 (0.15) | 0.0012 (0.10) | 0.1 (0.07) | 0.0005 (0.06) | 0.14 (0.12) | 0.0007 (0.10) |
| I651 | 0.6 (0.40) | 0.0023 (0.20) | 0.2 (0.13) | 0.0008 (0.10) | 0.36 (0.30) | 0.0014 (0.20) |
| Total | 151.8 | 1.1634 | 150.68 | 0.7972 | 120.34 | 0.7022 |

Scheme 1: Chemical structures of PE-4, PE-5, and PE-6

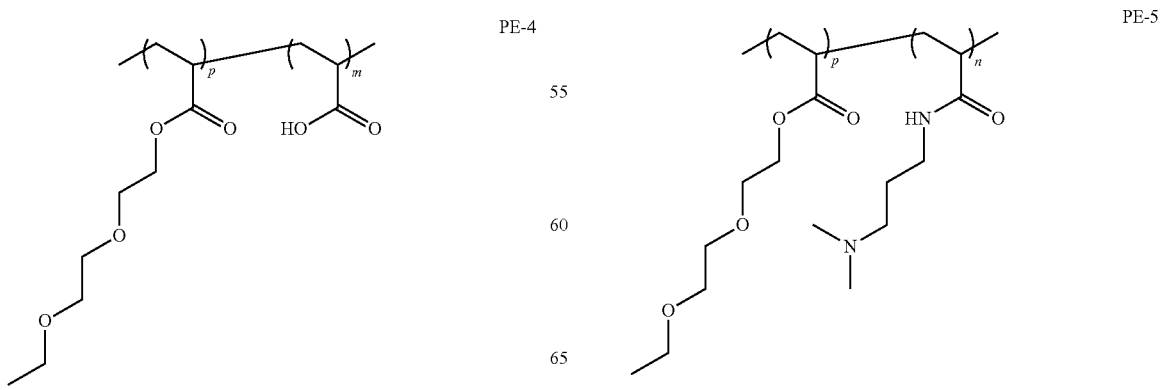

-continued
PE-6
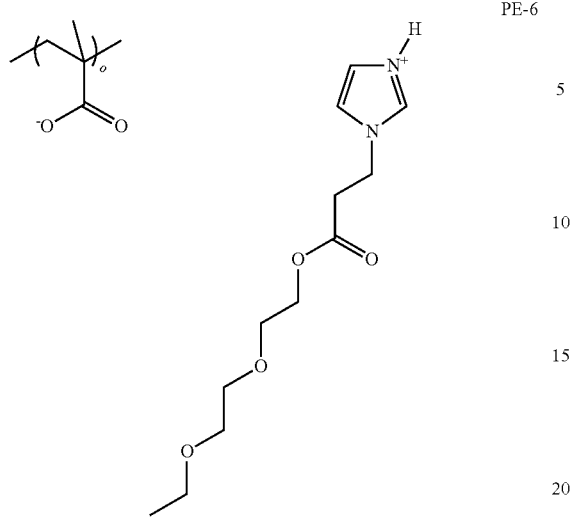
| MATERIAL | PE-7 | | Chemical structure of PE-7 |
|---|---|---|---|
| | Mass, g (wt.-%) | Moles (mole-%) | |
| DMAm | 31.72 (27.31) | 0.3200 (39.84) | |
| MAA | 17.21 (14.82) | 0.2000 (24.90) | |
| DMAPMAm | 34.05 (29.31) | 0.2000 (24.90) | |
| C12DMAPAm | 32.44 (27.93) | 0.0800 (9.96) | |
| IOTG | 0.33 (0.28) | 0.0016 (0.20) | |
| I651 | 0.41 (0.35) | 0.0016 (0.20) | |
| Total | 116.16 | 0.8032 | |
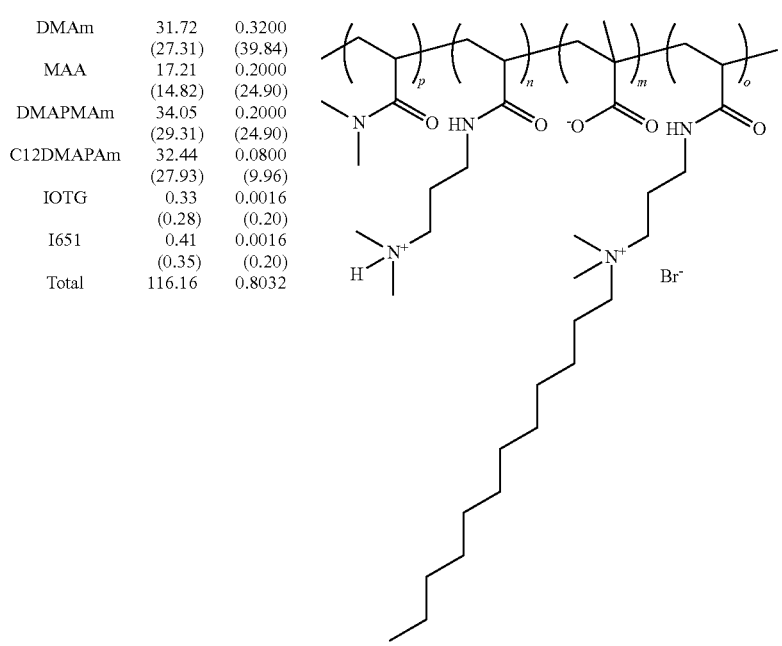

Examples 1 to 5, 8 to 10, 13 to 14 (EX-1 to EX-5, EX-8 to EX-10, EX-13 to EX-14) and Comparative Examples 6, 7, 11, and 12 (CE-6, CE-7, CE-11, and CE-12)

Phenolic-copolymer mixtures were prepared in 4 ounce (oz.) 70 mm diameter polypropylene straight walled jars (Taral Plastics, Union City, CA). Acrylic copolymer, phenolic resin and fillers were massed into the jar according to Table 4 and sealed with a screw cap. The jars were mixed in a Dual Asymmetric Centrifuge (DAC) SPEEDMIXER (FlackTek Inc., Landrum, SC) for 2 minutes at 2750 rpm and then allowed to remain at ambient temperature until all of the polymeric component dissolved. Once a homogeneous solution was achieved, the mixtures were mixed a second time at 2750 rpm for 2 minutes and stored in a refrigerator at 10° C. until use.

Samples were prepared and tested according to the viscoelastic characterization test method above. Results are summarized in Table 5.

TABLE 4A

Phenolic-copolymer mixtures

| MATERIAL | EX-1 | EX-2 | EX-3 | EX-4 | EX-5 | CE-6 | CE-7 | EX-8 | EX-9 | EX-10 | CE-11 | CE-12 |
|---|---|---|---|---|---|---|---|---|---|---|---|---|
| PF | 40.0 g | 37.5 g | 40.0 g | 37.5 g | 7.5 g | 40.0 g | 40.0 g | 37.5 g | 7.5 g | 37.5 g | 50.0 g | 37.5 g |
| PE-1 | 10.0 g | 12.5 g | | | | | | 12.5 g | | | | |
| PE-2 | | | 10.0 g | 12.5 g | | | | | 2.5 g | | | |
| PE-3 | | | | | 2.5 g | | | | | 12.5 g | | |
| PE-4 | | | | | | 10.0 g | | | | | | |
| PE-5 | | | | | | | 10.0 g | | | | | |
| PE-6 | | | | | | | | | | | | 12.5 g |
| Q325 | | | | | | | | 40.0 g | 8.0 g | 40.0 g | 40.0 g | |

TABLE 4B

Phenolic-copolymer mixtures

| MATERIAL | EX-13 | EX-14 |
|---|---|---|
| PF | 40.0 g | 40.0 g |
| PE-4 | | 5.0 |
| PE-5 | | 5.0 |
| PE-7 | 10.0 | |

TABLE 5

Polymerized unit composition by weight percent of phenolic-copolymer mixtures

| Material | EX-1 | EX-2 | EX-3 | EX-4 | EX-5 | CE-6 | CE-7 | EX-8 | EX-9 | EX-10 | CE-11 | CE-12 |
|---|---|---|---|---|---|---|---|---|---|---|---|---|
| PF | 80.0% | 75.0% | 80.0% | 75.0% | 75.0% | 80.0% | 80.0% | 41.7% | 41.7% | 41.7% | 55.6% | 75.0% |
| Anion | 7.0% | 8.7% | 7.3% | 9.2% | 9.2% | 5.5% | | 4.8% | 5.1% | 5.1% | | 6.3% |
| Cation | 6.6%* | 8.3% | 5.5% | 6.9% | 15.3% | | 10.0% | 4.6% | 3.8% | 8.5% | | 18.6% |
| Nonionic | 6.3% | 7.9% | 7.0% | 8.8% | | 14.4% | 10.0% | 4.4% | 4.9% | | | |
| Q325 | | | | | | | | 44.4% | 44.4% | 44.4% | 44.4% | |

*For EX-1, 3.2 wt.-% are polymerized units comprising a cationic group and 3.4 wt.-% are unpolymerized cationic groups.

TABLE 6

Summary of the viscoelastic characteristics of the make coat compositions tested

| Example | Complex Viscosity, Pa · s | | Tan(δ) | |
|---|---|---|---|---|
| | 20° C. | 65° C. | 20° C. | 65° C. |
| EX-1 | 2594.8 | 51.48 | 0.84 | 1.60 |
| EX-2 | 3391.7 | 90.84 | 0.87 | 1.32 |
| EX-3 | 2312.2 | 154.38 | 1.16 | 1.15 |
| EX-4 | 9244.3 | 374.22 | 1.15 | 0.92 |

TABLE 6-continued

Summary of the viscoelastic characteristics
of the make coat compositions tested

| | Complex Viscosity, Pa · s | | Tan(δ) | |
|---|---|---|---|---|
| Example | 20° C. | 65° C. | 20° C. | 65° C. |
| EX-5 | 24346 | 621.55 | 1.40 | 1.60 |
| CE-6 | 1285.9 | 22.08 | 1.39 | 3.16 |
| CE-7 | 2394.1 | 30.01 | 1.36 | 2.90 |
| EX-8 | 3826.5 | 495.04 | 1.08 | 0.83 |
| EX-9 | 17469 | 937.78 | 1.00 | 0.87 |
| EX-10 | 59783 | 1356.4 | 1.40 | 1.74 |
| CE-11 | 639.16 | 2.07 | 1.11 | 8.25 |
| CE-12 | 180.74 | 1.68 | 3.65 | 13.86 |
| EX-13 | 5612.1 | 259.9 | 0.88 | 0.99 |
| EX-14 | 2854.7 | 84.44 | 0.95 | 1.70 |

The data in Table 6 indicate that compositions of the current invention (EX1 to EX5, EX-8 to EX-10, EX-13 to EX-14) maintain higher viscosity and are more elastic (i.e., have a lower tan(δ) value), at elevated temperature than the comparative materials that have copolymers without the polymerizable ionic liquid (PIL) monomers (CE-6, CE-7, and CE-11) or a PIL with a non-polymerizable counterion. This indicates that they are more resistant to flow at high temperature and should enable the retention of abrasive orientation during cure.

Example 15 (EX-15): Abrasive Belt

An abrasive belt (Example 15, EX-15) was prepared using EX-8 and SAP1. EX-8 was hot-knife coated at 90° C. between two 6 inch (15.2 cm) wide poly(ethylene terephthalate) release liners to a thickness of 0.10 mm (0.004 inch). One liner was removed and a sample of the make coat film was laminated onto YF-type abrasive belt backing (polyester backing described in Example 12 of U.S. Pat. No. 6,843,815, Thurber et al.) using a 2 inch (5.1 cm) wide soft rubber hand roller. The finished samples were approximately 48 inches×4 inches (121.9 cm×10.2 cm) in size. The second release liner was removed and the SAP1 shaped abrasive particles were transferred in a batch process as described in U.S. 2017/0225299 A1 (Keipert et al.). The shaped abrasive particles were arranged as shown in FIG. 2B of U.S. 2017/0225299 A1 (Keipert et al.). The belt sample was then cured in a forced air oven for 90 minutes at 90° C. and 60 minutes at 103° C. The belt sample was then coated with a size coat composition, followed by a supersize coat composition. The size coat composition was prepared by charging a 3 liter (L) plastic container with 431.5 g of PF, 227.5 g of FILL 227.5 g of FIL2 and 17 g of RIO, mechanically mixing and then diluting to a total weight of 1 kilogram with water. The prepared size coat composition was then coated onto the belt sample at a coverage rate of 483 grams per square meter with a 75 cm paint roller and resultant product was cured at 90° C. for 60 minutes and then at 102° C. for 8 hours more. The supersize coat composition was prepared according to Example 26 of U.S. Pat. No. 5,441,549 (Helmin) starting at column 21, line 10. The prepared supersize coat composition was then coated onto the belt sample using a 75 cm paint roller with a coverage of 462 grams per meter square. The product was cured at 90° C. for 30 minutes, 8 hours at 102° C. and 60 minutes at 109° C.

The performance of the coated belts were evaluated on stainless steel 304 by the Belt Grinding Test Method described above. Test results are summarized in Table 7.

TABLE 7

Summary of abrasive belt testing for phenolic-
copolymer and current phenolic make coats.

| | Total Steel Cut (g) | Belt Wear (g) |
|---|---|---|
| EX-15 | 490.9 | 4.41 |

Example 16 (EX-16): Abrasive Fiber Discs

An abrasive belt (Example 16, EX-16) was prepared using EX-9 and SAP2. 5 to 6 g aliquots of make resin EX-9 was hot-pressed at 60° C. for 1 minute in a hydraulic press (Model 2699 Carver, Inc., Wabash, IN) between two poly (ethylene terephthalate) release liners (T10, Loparex, Cary, NC). Steel shims of thickness 0.08 mm (0.003 inches) were used to control the average thickens of the pressed film. One release liner was removed and a sample of the make coat film was laminated onto a 7 inch (17.8 cm) diameter fiber disc backing (7 inches (17.8 cm) diameter 0.83 mm thick vulcanized fiber web (DYNOS VULCANIZED FIBRE, DYNOS GmbH, Troisdorf, Germany) having a 0.875 inch (2.22 cm) center hole) using a 2 inch (5.1 cm) wide soft rubber hand roller. The make coat and backing were then hot-pressed at 38° C. for 30 seconds using 5 metric tons of clamping force. The second release liner was removed and the SAP2 shaped abrasive particles were transferred in a batch process as described in US 2017/0225299 A1 (Keipert et al.) with tooling scaled proportionally to accommodate the size of SAP2. The disc sample was then cured in a forced air oven for 45 minutes at 70° C. and 45 minutes at 90° C. and 3 hours at 105° C. The size coat composition was prepared by charging 108 g of PF, 170 g of FILL 5.1 g of RIO, and 17 g of tap water in a plastic container followed by mechanically mixing. The prepared size coat composition was then coated onto the disc sample at a coverage rate of 307 grams per square meter with a 75 cm paint roller and resultant product was cured at 70° C. for 45 minutes and 90° C. for 45 minutes and 105° C. for 16 hours.

The grinding performance of prepared abrasive fiber discs was evaluated using the Abrasive Fiber Disc Performance Test Method described above. Test results were reported as the incremental cut (g/cycle) for each interval and the total stock removed (g). Test results are summarized in Table 8.

TABLE 8

Summary of abrasive fiber disc testing for phenolic-copolymer

| | EX-16 | |
|---|---|---|
| | Incremental Cut | |
| Cycle Number | Average of 3 Trials, g | Standard Deviation, g |
| 5 | 22.29 | 1.17 |
| 10 | 21.55 | 0.48 |
| 15 | 21.75 | 0.19 |
| 20 | 21.01 | 1.08 |

TABLE 9

Molecular size and Equivalent Molecular weight by
Dynamic Light Scattering of Acrylic Copolymers

| MATERIAL | CONCENTRATION Wt. % | $D_h$ (nm) | $M_D$ (kg/mole) |
|---|---|---|---|
| PE-1 | 2.13 | 50.9 | 408 |
| PE-2 | 2.13 | 63.4 | 564 |
| PE-3 | 2.06 | 28.4 | 173 |
| PE-4 | 2.15 | 61.7 | 541 |
| PE-5 | 2.00 | 43.9 | 328 |
| PE-6 | 2.02 | 56.8 | 479 |
| PE-7 | 2.00 | 41.8 | 305 |

What is claimed is:

1. A cured phenolic resin composition comprising
at least 50 wt.-% of cured phenolic resin based on a total weight of organic components of the phenolic resin composition;
first polymerized units comprising a cationic group and the cationic group is a substituted ammonium compound; and
second polymerized units comprising an anionic group;
wherein the first polymerized units comprising the cationic group and second polymerized units comprising the anionic group are first and second polymerized units of a copolymer comprising greater than 10 wt. % of polymerized units of acid functional monomer; and/or
wherein a first polymer comprises the cationic group and a second polymer comprises the anionic group; and
wherein a portion of the anionic groups or cationic groups are ionically bonded to an unpolymerized imidazole compound.

2. The cured phenolic resin composition of claim 1 wherein the cationic groups are ionically bonded to the anionic groups.

3. The cured phenolic resin composition of claim 1 wherein the phenolic resin composition comprises 0.5-30 wt.-% of polymerized units comprising the cationic group, based on the total weight of organic components of the phenolic resin composition.

4. The cured phenolic resin composition of claim 1 wherein the phenolic resin composition comprises 0.5-30 wt.-% of polymerized units comprising the anionic group, based on the total weight of the organic components of the phenolic resin composition.

5. The cured phenolic resin composition of claim 1 wherein the anionic group is an acidic group selected from a carboxylate group, a sulfonic acid group, or a phosphonic acid group.

6. The cured phenolic resin of claim 1 wherein the copolymer comprises an acrylic backbone, first pendent groups comprising the first polymerized units comprising the cationic group and second pendent groups comprising the second polymerized units comprising the anionic group.

7. The cured phenolic resin composition of claim 1 wherein the phenolic composition comprises 1 wt.-% to 50 wt.-% of the copolymer.

8. The cured phenolic resin composition of claim 1 wherein the phenolic composition comprises 1 wt.-% to 50 wt.-% total of the first and second polymer.

9. The cured phenolic resin composition of claim 1 wherein the phenolic resin composition comprises a resole phenolic resin.

10. The cured phenolic resin composition of claim 1 wherein the phenolic resin composition prior to curing has a complex viscosity at 65° C. of at least 50 Pascal(seconds).

11. The cured phenolic resin composition of claim 1 wherein the phenolic resin compositions prior to curing has a tan delta at 65° C. ranging from 0.5 to 2.5.

12. An abrasive article comprising abrasive particles at least partially embedded in the cured phenolic resin composition comprising:
at least 50 wt.-% of cured phenolic resin based on a total weight of organic components of the phenolic resin composition;
first polymerized units comprising a cationic group and the cationic group is a substituted ammonium compound; and
second polymerized units comprising an anionic group;
wherein the first polymerized units comprising the cationic group and second polymerized units comprising the anionic group are first and second polymerized units of a copolymer comprising greater than 10 wt. % of polymerized units of acid functional monomer; and/or
wherein a first polymer comprises the cationic group and a second polymer comprises the anionic group.

13. The abrasive article of claim 12 wherein the abrasive particles are shaped abrasive particles.

14. The abrasive article of claim 12 wherein the cured phenolic resin composition comprises 0.5-30 wt.-% of polymerized units comprising the cationic group, based on the total weight of organic components of the phenolic resin composition.

15. The abrasive article of claim 12 wherein the cured phenolic resin composition comprises 0.5-30 wt.-% of polymerized units comprising the anionic group, based on the total weight of the organic components of the phenolic resin composition.

16. The abrasive article of claim 12 wherein the anionic group is an acidic group selected from a carboxylate group, a sulfonic acid group, or a phosphonic acid group.

17. The abrasive article of claim 12 wherein the cured phenolic resin composition comprises 1 wt.-% to 50 wt.-% of the copolymer or 1 wt.-% to 50 wt.-% total of the first and second polymer.

18. The abrasive article of claim 12 wherein the cured phenolic resin composition comprises a resole phenolic resin.

19. The abrasive article of claim 12 wherein the cured phenolic resin composition prior to curing has a complex viscosity at 65° C. of at least 50 Pascal(seconds).

20. The abrasive article of claim 12 wherein the cured phenolic resin composition prior to curing has a tan delta at 65° C. ranging from 0.5 to 2.5.

* * * * *